Sept. 27, 1966  M. INGRAM  3,274,826
DIRECT READING SHAFT HORSEPOWER METER SYSTEMS
Filed Sept. 28, 1962  9 Sheets-Sheet 1

INVENTOR,
Maxwell Ingram
by Peck + Peck
Attorneys

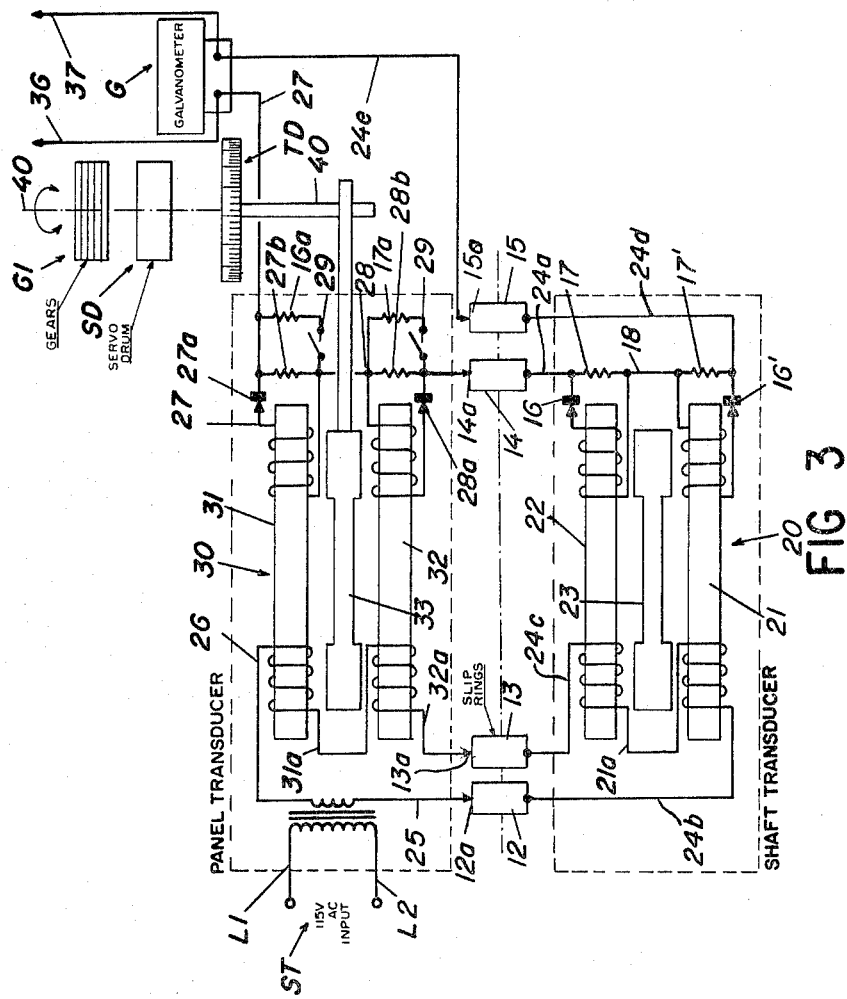
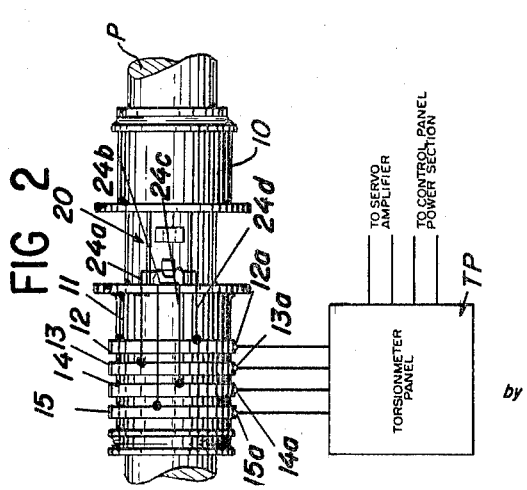

Sept. 27, 1966  M. INGRAM  3,274,826

DIRECT READING SHAFT HORSEPOWER METER SYSTEMS

Filed Sept. 28, 1962  9 Sheets-Sheet 3

INVENTOR
Maxwell Ingram
by Peck + Peck
Attorneys

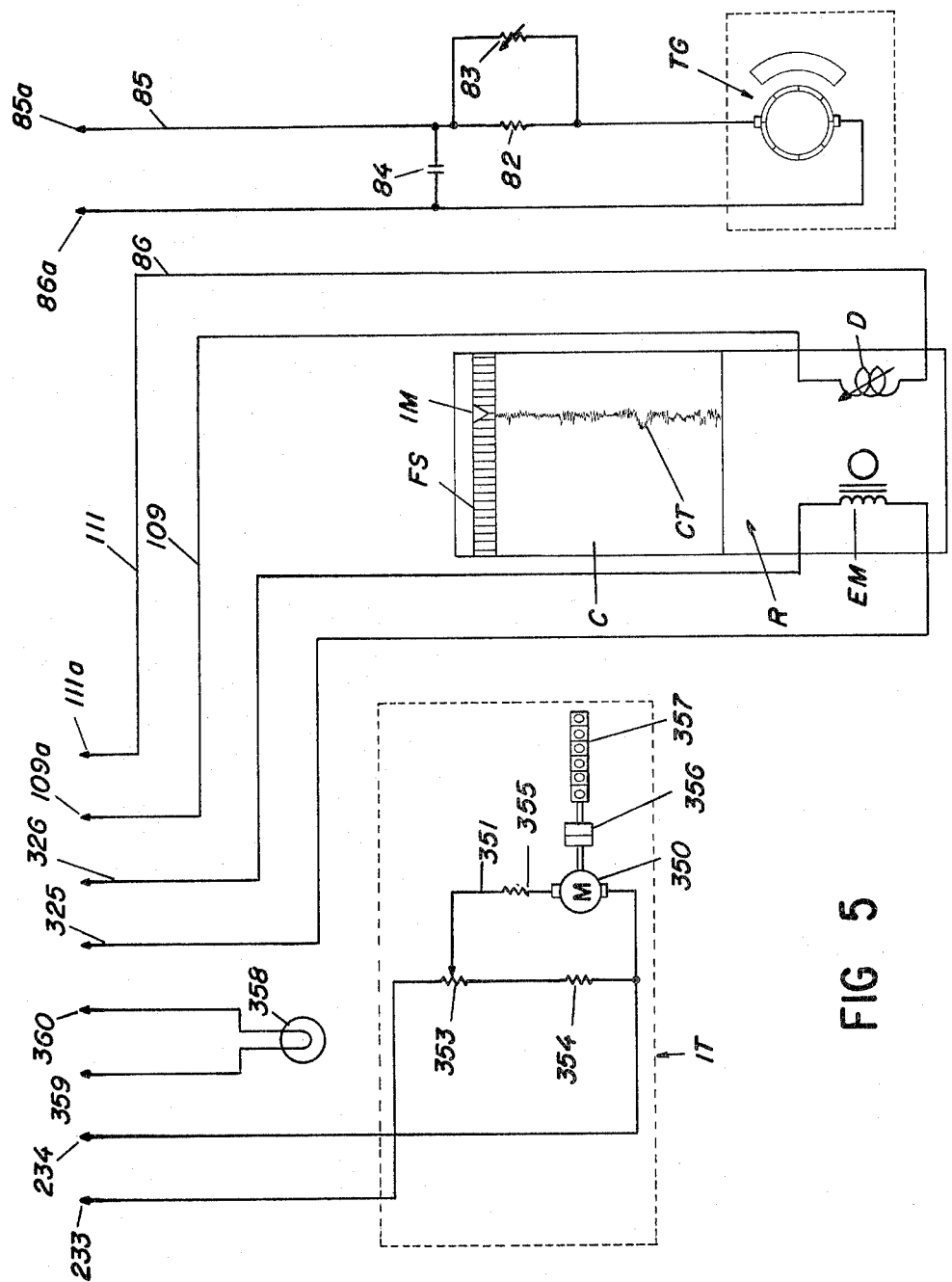

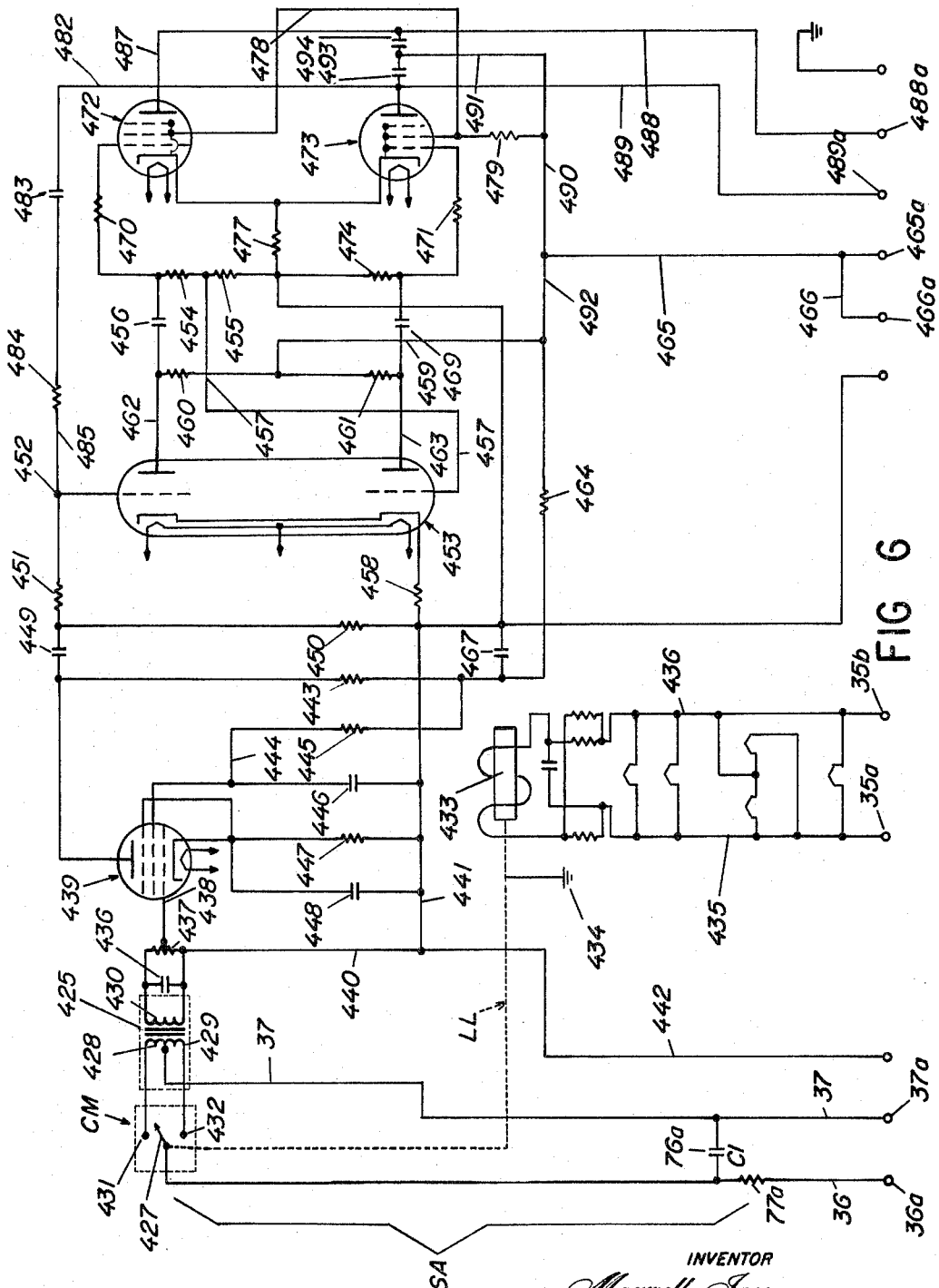

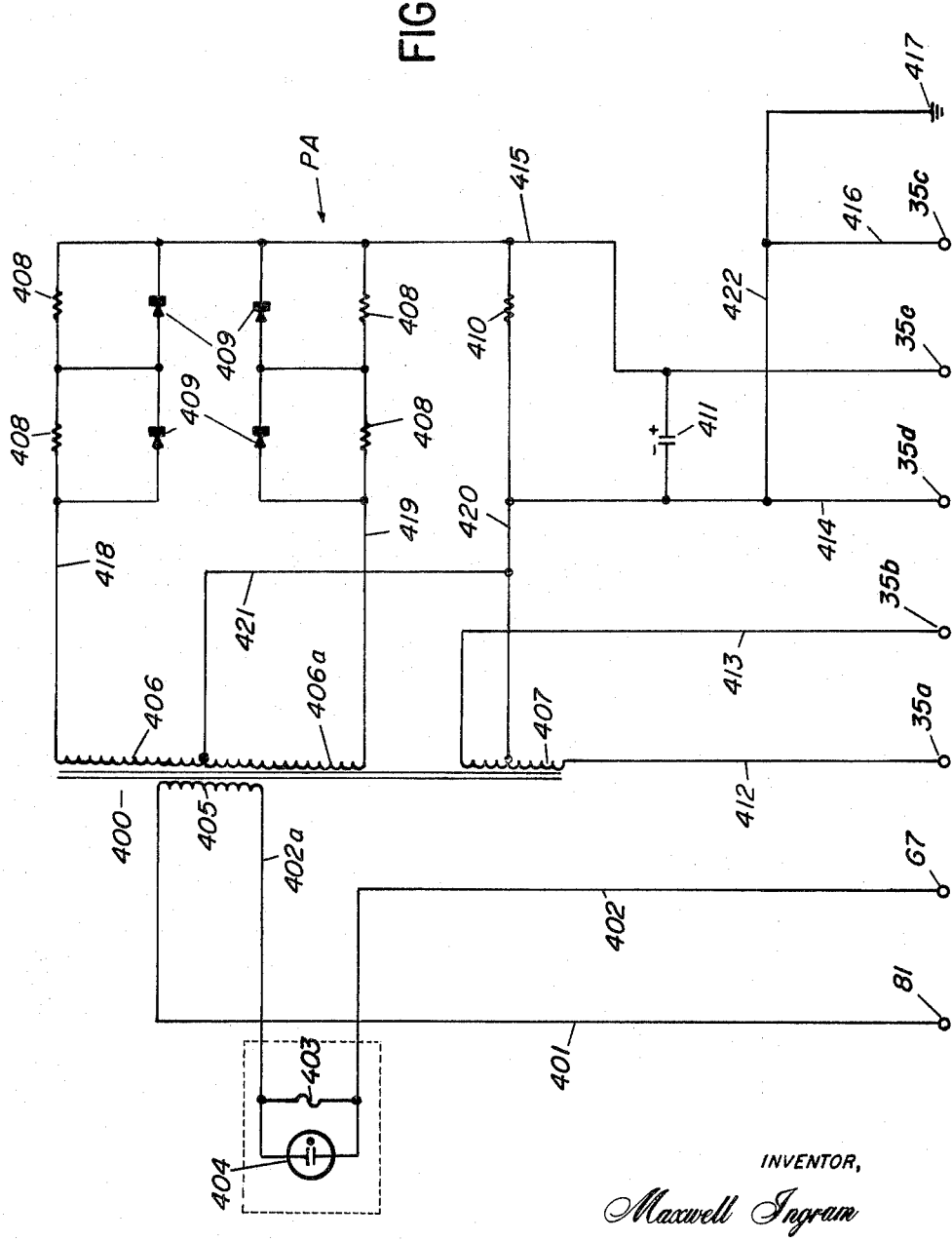

Sept. 27, 1966  M. INGRAM  3,274,826
DIRECT READING SHAFT HORSEPOWER METER SYSTEMS
Filed Sept. 28, 1962  9 Sheets-Sheet 7
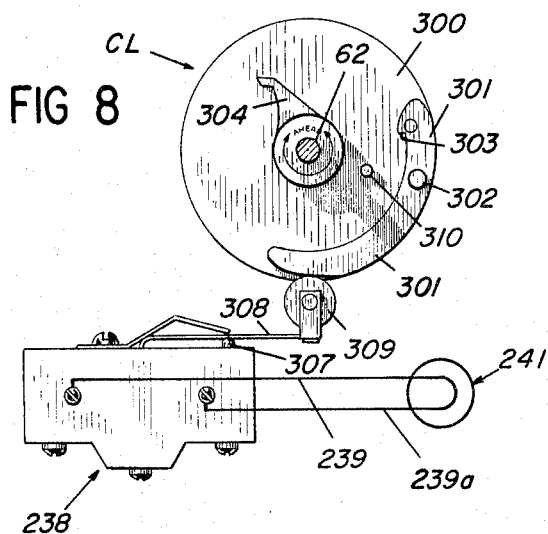
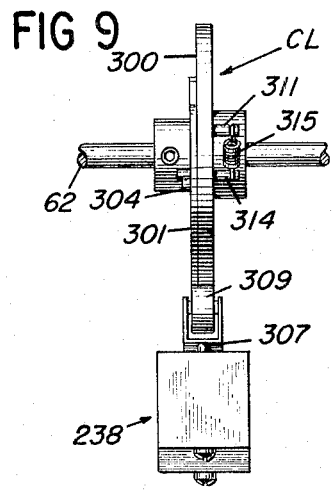
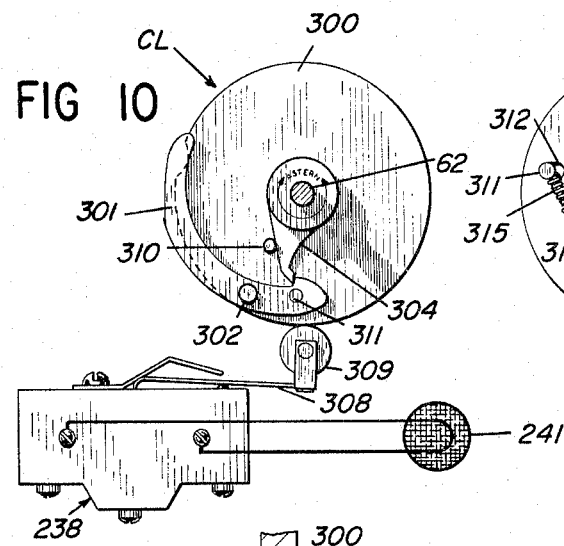
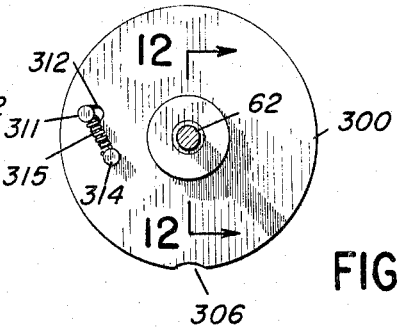
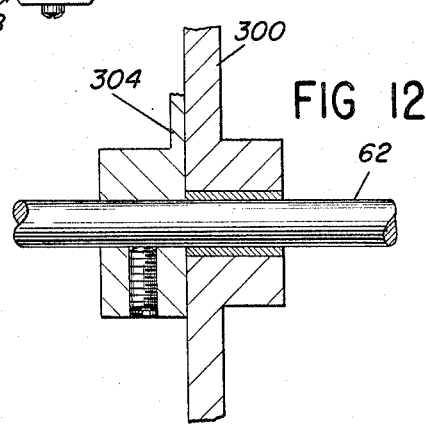
INVENTOR,
Maxwell Ingram
by Peck & Peck
Attorneys

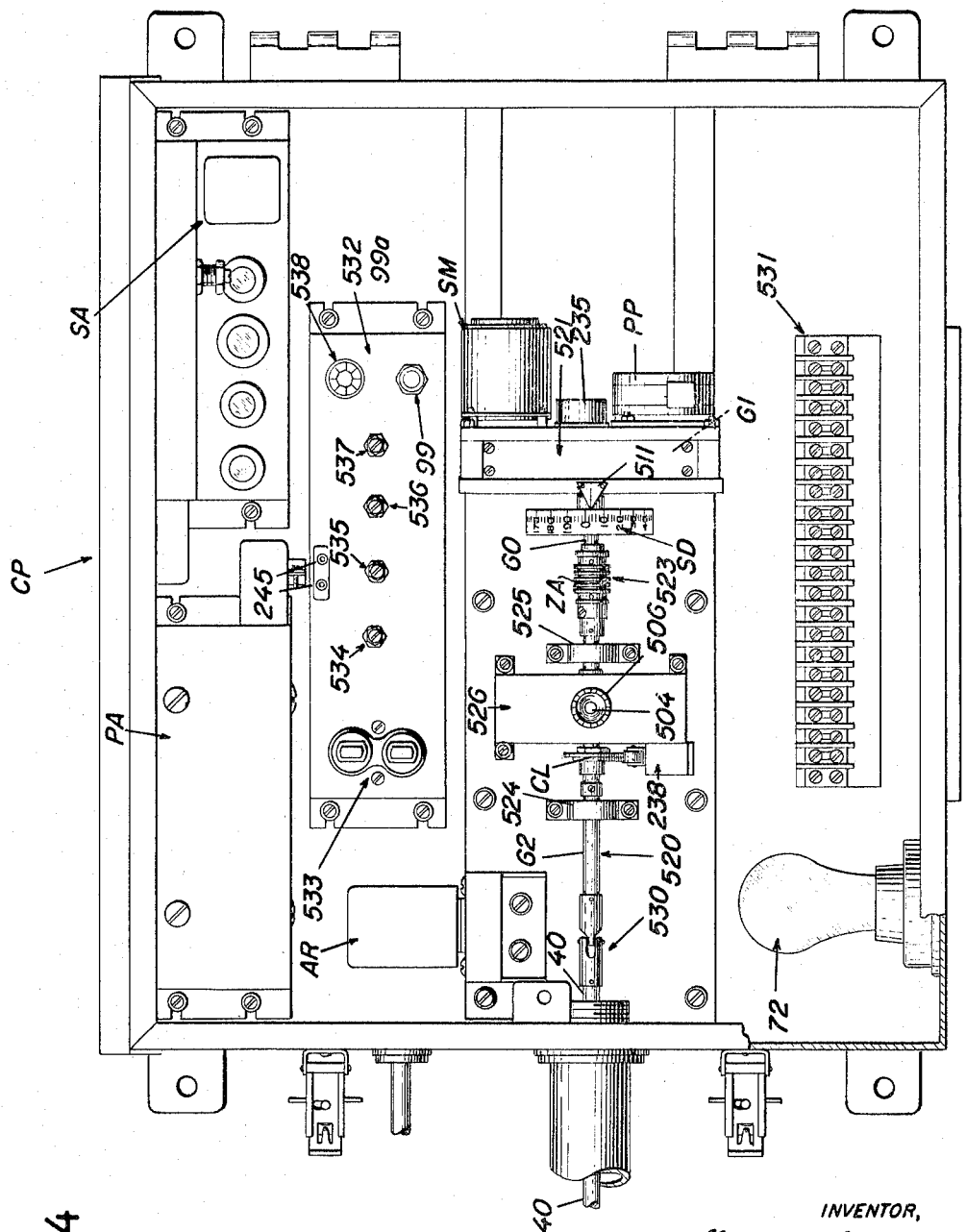

3,274,826
United States Patent Office

Patented Sept. 27, 1966

3,274,826
DIRECT READING SHAFT HORSEPOWER METER SYSTEMS
Maxwell Ingram, 15 Hamilton Ave., Dumont, N.J.
Filed Sept. 28, 1962, Ser. No. 226,866
14 Claims. (Cl. 73—136)

This invention relates to direct reading shaft horsepower meter systems and methods; and the nature and objects of the invention will be readily recognized and understood by those skilled in the arts to which the invention relates in the light of the following explanation and detailed description of the accompanying drawings illustrating what I now believe to be preferred embodiments or structural, mechanical and electrical expressions of a system of my invention and of the preferred steps of a method thereof, from among various other embodiments, expressions, constructions and combinations of components, and from among various other method steps of which a system and method of the invention are capable within the broad spirit and scope thereof as defined by the claims hereto appended.

My present invention is particularly concerned with systems and methods for continuously determining and constantly indicating, as well as permanently recording and integrating the horsepower output developed through and by a powered rotary driving shaft or equivalent member of a powered prime mover so that at any moment during operation of such powered shaft one can instantly visually determine and read the horsepower output at the moment of reading, while at the same time a permanent record is being made of the horsepower output of the shaft and shaft horsepower-hours are being totalized throughout and during the period of operation thereof. While such horsepower meter systems and methods have general industrial utility for determining and indicating horsepower outputs from a powered driving member of any prime mover, they have particular utility and value in the operation of propeller driven ships for the most efficient operation of such a ship. While I have hereinafter disclosed a horsepower meter system and method designed for and installed for use as a meter system for accurately indicating and recording and integrating the horsepower transmitted through a propeller shaft which reflects the output to drive the ship, and in the description of such example have used the terms propeller shaft and other marine terms, it is to be understood that such terms are used in the broad generic sense to cover and include powered rotating shafts or equivalent powered members driven from and by any type of prime mover and serving as driving or driven shafts to transmit power from the prime mover to any desired driven element or unit.

In the operation of a propeller-driven ship it is necessary for most efficient operation of the ship, to know and be advised at all times of the expended power transmitted through and by the ship's propeller shaft to the propeller so that the operator can, by using such knowledge, determine the most efficient operating power-speeds under the varying conditions encountered for propelling the ship in order for the ship to reach its destination in the shortest possible time with a minimum of fuel consumption and without dangerous overloading of the machinery equipment. As will be understood by those experienced in the operation of power propelled ships, it is possible in the operation of a ship to reach a point in the upper speed range where a percentage of speed increase will require a much greater percentage increase in the horsepower with the requirement for a corresponding excess amount of fuel to develop such much larger relative percentage increase in horsepower to attain such smaller percentage increase in speed. Further, it is important in the operation of a ship that the operator be instantly informed when the safe maximum rate of power that should be transmitted through the gear box, couplings and shaft of the power unit is exceeded in order that remedial action may be taken. Similarly, it is important to the operation that an operator be informed when power is built up too rapidly with possible overstressing of parts and waste of power, and of excessive shock stresses in the shaft during storms and turbulent seas. Further, in order to contribute to maximum efficiency of ship operation, it is essential to relate horsepower and fuel consumption for the most efficient operation of a ship under the particular operating conditions which it is encountering at any given time, such as quantity of turbine nozzles employed, change of ship hatch loading, winds, waves, roll and pitch, propeller partially out of water, hull contamination, speed in r.p.m., steam volume and pressure, and other variable factors.

It is, therefore, a primary and main object of the invention to provide a practical and efficient method and system for continuously, accurately determining and visually indicating for direct reading the actual horsepower output through the powered shaft of a prime mover, such as the propeller shaft of a ship, at any time during the powered operation of the shaft without requiring any additional computation and/or reference to any tables, charts or other data to arrive at the horsepower output of the shaft.

A further object is to provide such a method and system for indicating horsepower which will not only give a continuous visual indication for direct reading of the horsepower output of a shaft at any and at all times during operation thereof, but which also provides for continuously trace recording graphically the horsepower output and maneuvers during and through a period of operation, producing a permanent record with respect to time and day which may be removed for study and analysis and filing or storage as a permanent future reference record.

A further object is to provide for continuous trace recording graphically in such a manner that the trace drawn on the recording chart will record maneuvers of the ship by changes in the trace in the form of what may be called "pipes" or sharp deviations from the steady straight-line form of the trace, so that the recording on a chart will show graphically the complete maneuvers through which the ship has been operated over the period of time over which the recording has been made.

Another object is to provide a method and system by which not only a visual, direct reading indication and a permanent recording of the horsepower delivered by a shaft during and throughout a period of operation is given and made, but further by which an integration and totalizing of horsepower output with respect to time for horsepower-hours of the powered shaft is visually indicated and recorded.

Another object is to provide such a system in which the indicator and recorder for continuously indicating and recording horsepower always read up-scale irrespective of the direction of rotation of the power-driven propeller shaft, so that in the case of a propeller-driven ship, when the shaft is reversed for astern propulsion of the ship, the horsepower indicator, recorder and integrator will read up-scale in the same direction and manner as when the propeller shaft is rotating in the other direction for driving the ship ahead.

A further object is to provide a method for continuously, visually indicating automatically the horsepower output of a powered driving shaft, such as the propeller shaft of the ship, during operation thereof by continuously positioning a proportion of a fixed or variable voltage relating directly to the torque in the shaft at any given instant during operation thereof, and in conjunction therewith continuously generating as a variable a voltage directly proportional to the r.p.m. of the shaft and relatively multiplying or dividing these variables to develop an output voltage which is a product of the proportional variable reflecting torque and of the variable voltage reflecting r.p.m. of the power driven shaft, and then utilizing such single output voltage to obtain direct indication, recording and integration of the shaft horsepower.

A further object is to provide a system for carrying out such method in which the slide arm of a potentiometer reflects torque by the slide arm position, to pick-off a proportional voltage to that developed by the speed of rotation of a tachometer generator driven by the propeller shaft.

Another object is to provide a system for determining and indicating the actual horsepower output of a powered driving shaft in which system there is included an efficient non-repetitive micro-switch cam and latching assembly and circuitry for indicating by an alarm light when the torque in the shaft is astern in direction, irrespective of shaft direction rotation so that in the case of a propeller shaft of a ship, the alarm will light when the torque is in the direction for astern propulsion of the ship or in the astern direction when slowing down propeller through its shaft by power when in ahead rotation.

A further object is to provide a method and system for shaft horsepower determination and indication, recording and integration in which the ultimate output voltage for utilization to effect shaft horsepower indication and totalizing is a D.C. voltage to thereby avoid the errors caused from out-of-phase relationships in magnitudes of currents as well as frequency variations which are caused by the use of an A.C. output voltage.

Another object is to provide such a system which is unaffected by power line voltage and frequency variations so that accuracy of results of shaft horsepower determination and the readings thereof are obtained.

Another object is to include and coordinate as a built-in part of such a system, a circuit network and indicator for checking-out the entire shaft horsepower determining and indicating system, and further to provide means as a part of this system for making a permanent test record with the recorder of the system.

A further object is to provide such a system and method which can be used for static calibration of the driving shaft from a prime mover, such as a ship's propeller shaft, for both torque and possible shaft horsepower under static conditions, and to enable such latter calibration by the use of the internal test voltage or by the use of fixed or different external test voltages simulating r.p.m. at any particular value, or many values.

Another object is to provide such a system for determining, indicating, recording and integrating shaft horsepower, which will automatically compute all of the variable and constant factors, such as shaft torque, shaft r.p.m., and shaft modulus of rigidity.

A further object is to provide a method in a system for determining, indicating, recording and integrating or totalizing, which utilizes a dual or tandem precision potentiometer having one section thereof connected for shaft horsepower indication and recording, and the other section connected for integration or totalizing; and further, to provide a method by which operation and functioning of such potentiometer with the instrumentalities connected therewith, are independent of each other and is carried out without adversely affecting linearity of the potentiometer, when a corrective network is employed, by overloading.

Another object is to provide a method of determining magnitude and direction in measuring torque by the use of differential transducers by polarity and signal strength changes which are fed into a chopper modulated servo amplifier to the control windings of a servo motor for direction and quantity of rotation.

Another object is to provide a system having the foregoing general features and characteristics which may be utilized in connection with one or two variables which may be the displacement of two magnitudes with respect to the displacement of one magnitude with respect to voltage in terms of a speed, or an output voltage of another for use of the system in gaging and the like operations.

And a further object is to provide a system for determining, indicating and recording shaft horsepower which will indicate and record negative shaft horsepower when reversed torque is suddenly applied to a shaft, such as in the case of the slowing down of a ship by rapidly reversing the torque in the propeller shaft to quickly stop or retard the ship.

With the foregoing and various other objects, features and results in view which will be readily apparent to and recognized by those skilled in the arts involved from the following explanation and detailed description, my invention consists in certain novel features in design and construction and elements and components and in the combinations and functioning thereof constituting certain of the steps of a method of my invention, all as will be more fully and particularly referred to and specified hereinafter.

Referring to the accompanying drawings in which similar reference characters refer to corresponding parts and elements throughout the several figures thereof:

FIG. 1 is a schematic block diagram of an example system of my invention for installation on a ship for determining, indicating, recording and integrating the horsepower delivered by the propeller shaft in the ship, the components or units making up the system being shown schematically in block form with identifying legends applied thereon and with the connections and circuits connecting such components in operative relation also being shown schematically.

FIG. 2 is a diagrammatic view in side elevation of a portion of the propeller shaft of a ship with the shaft mounted transducer and independent mounting sections therefor on the shaft shown in electrical connection with the slip rings and the torsion meter panel, the latter being shown in block form.

FIG. 3 is a schematic showing of the propeller shaft mounted transducer unit, the panel mounted transducer unit in operative electrical connection therewith and further showing schematically the shafting for operating the panel mounted transducer with the servo drum and torsion meter drum, shaft gearing and galvanometer electrically connected with the transducers.

FIG. 4 is a detailed circuit or network diagram schematically and electrically shown and expressed and in continuation of the transducers and associated components of FIG. 3, FIG. 4 with FIG. 3 together expressing the system as broadly schematically and interconnectedly shown by the block diagram of FIG. 1.

FIG. 5 is a circuit diagram schematically shown as in continuation and a part of the circuit or network diagrams of FIGS. 3 and 4, with the servo motor, indicator and recorder and integrator units being diagrammatically shown in operative electrical connection therein.

FIG. 6 is a network or circuit diagram and interconnected components making up the servo amplifier of the system as schematically shown in FIGS. 3, 4 and 5.

FIG. 7 is a network or circuit diagram for the power supply unit of the system of FIGS. 3, 4 and 5.

FIG. 8 is a side elevation, more or less diagrammatic of the astern indicating lamp controlling micro switch and the cam latching assembly for selective control of such switch.

FIG. 9 is an end elevation of the switch and cam latch assembly of FIG. 8.

FIG. 10 is a side elevation of the switch and cam latching assembly similar to FIG. 8 but showing the cam latching assembly in operative position during astern operation of the ship propeller shaft with the switch in lamp circuit closing position and the lamp lit thereby, the lamp and circuit being schematically shown.

FIG. 11 is a side elevation of the opposite side of the cam latching assembly from the side thereof shown in FIGS. 8 and 10.

FIG. 12 is a detailed sectional view taken as on the line 12—12 of FIG. 11.

Figure 13:
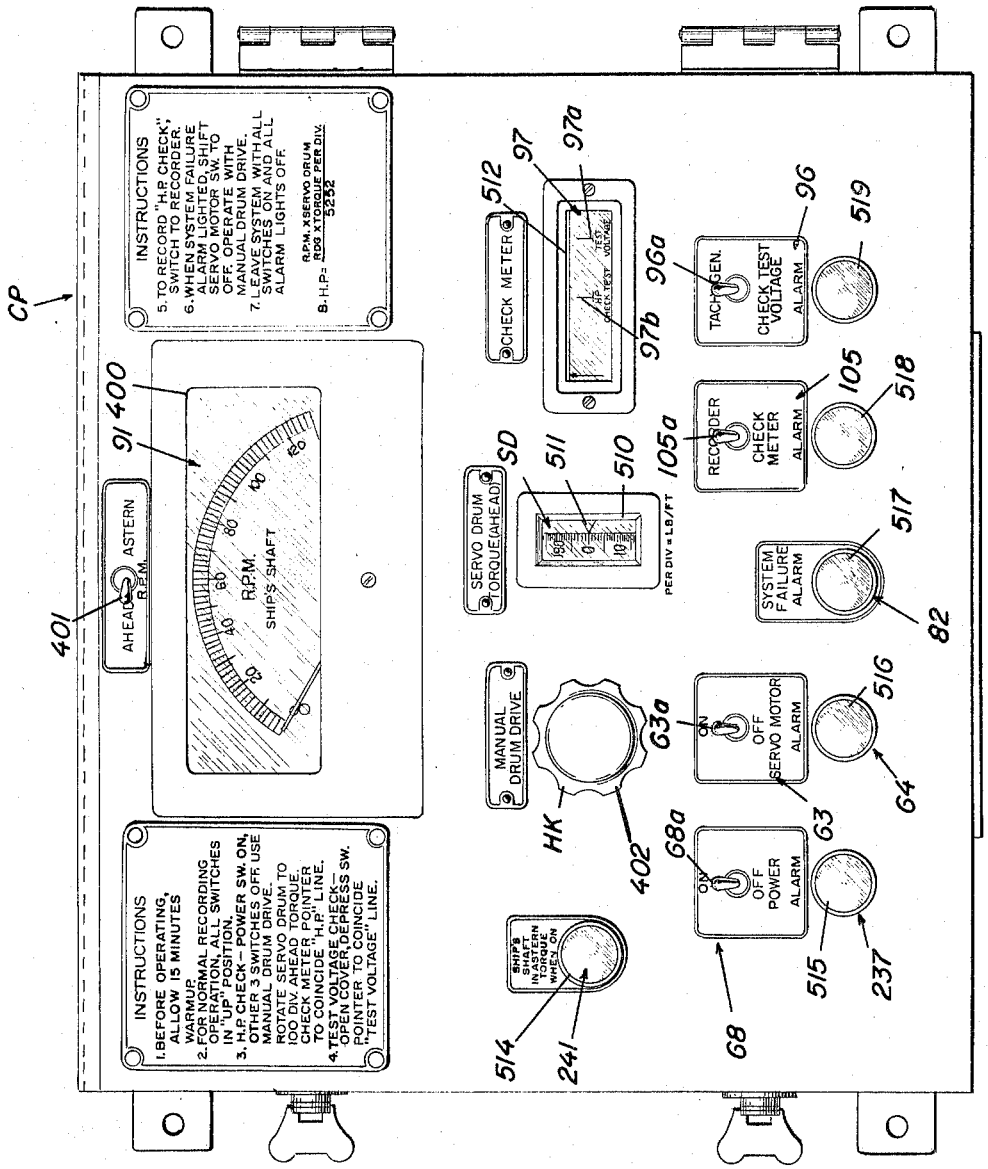

FIG. 13 is a front elevational view of the control panel of the control box or cabinet or the horsepower determining and indicating system of FIGS. 1, 2, 3, 4 and 5, showing particularly the supplementary reading or indicating dials of the system, the alarm lights for the test check-outs and for system failures, and the various manually operable control switch units and knobs for selective actuation by an operator.

FIG. 14 is a view in elevation of the interior of the control box or cabinet of FIG. 3 with a wall thereof removed and showing in elevation various elements and components of the system of FIGS. 1 through 5 in mounted position therein.

For the purpose of explaining the method and the system and the components making up a system of the invention so that those skilled in the art may understand the invention, I have selected and disclosed herein as example expressions thereof, a method and system for determining, indicating, and recording the shaft horsepower delivered by the propeller shaft of a ship. However, it is to be understood that the invention is not limited or restricted to use for determining, indicating, and recording the horsepower delivered by the propeller shaft of a ship, but is capable of and intended for use generally for the purpose of determining the horsepower delivered by any powered shaft or member of any type of prime mover. Further, the invention is adapted to, capable of, and intended for use for determining relationships between and resultants from variables such as the displacement of two magnitudes with respect to the displacement of one magnitude relative to the speed or voltage of another, and using the resultants to effect or obtain various purposes.

With a rotary powered member of a prime mover, the horsepower delivered by such member is a function of torque and r.p.m. or speed of rotation of the member. The basic steps of a method of my invention as expressed by the functioning and operations of the selected example system of the invention for ship installation for determining, indicating, and recording the horsepower being delivered at any instant by the ship's propeller shaft, consist essentially in developing as a variable a differential signal voltage proportional to propeller shaft twist resulting from the torque applied to the shaft to mechanically position a shaft relative to this voltage, generating as a variable a signal voltage directly proportional to the r.p.m. or speed of rotation of the shaft, multiplying such variable signal voltages by electromechanical means to produce a resultant output voltage, and utilizing such output voltage to effect operation of visual indicating, recording and integrating instruments. The method with such basic steps includes various intermediate and auxiliary steps, and it is believed that these basic and other steps which together make up a method of the invention may be best brought forth and explained from the following description and explanation of the selected example of a system of the invention for determining the horsepower delivered at any instant during operation of the propeller shaft of a ship.

Figure 1:
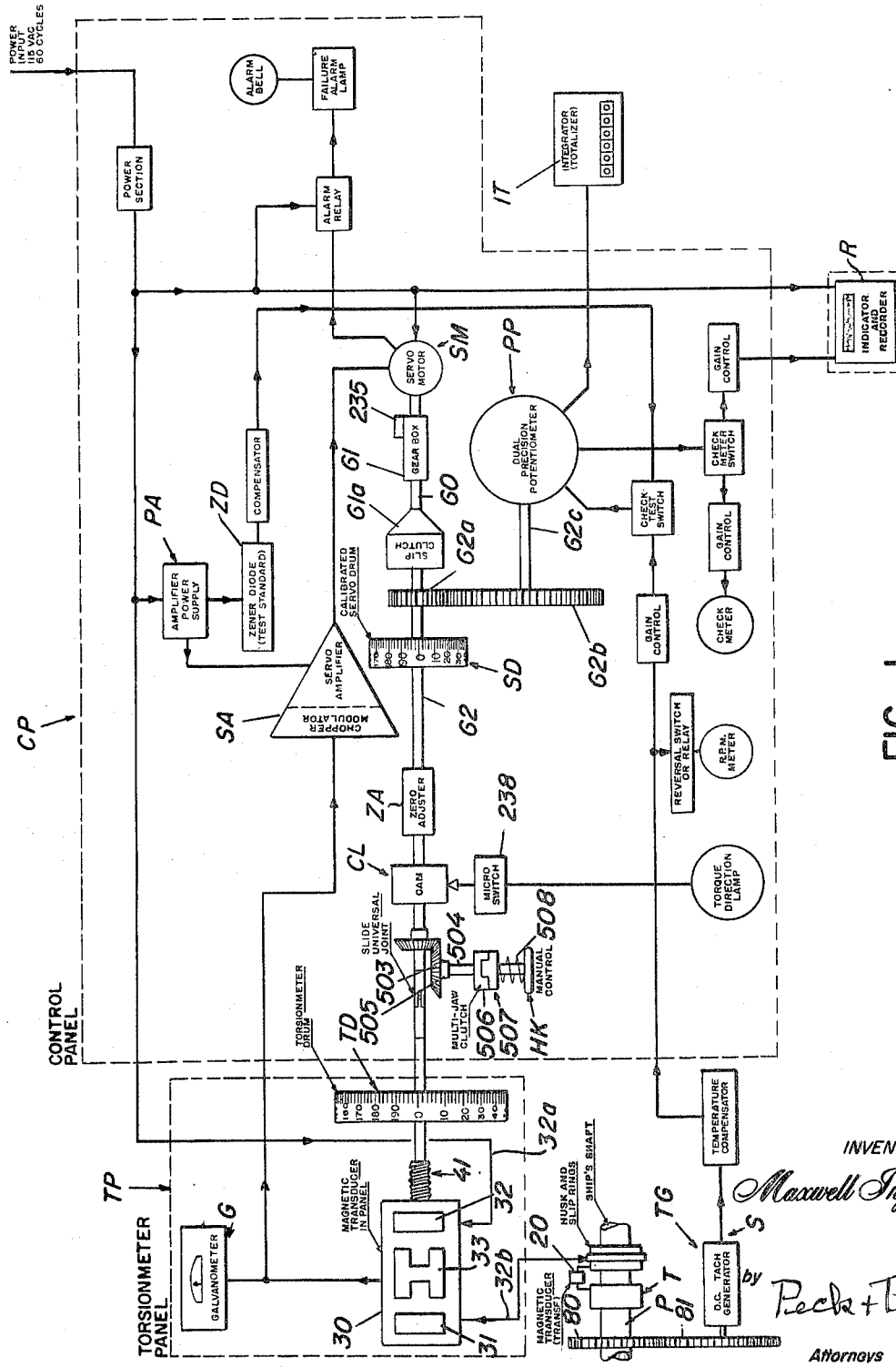

In the selected example, referring now to FIG. 1 in connection with FIG. 4, the installation of the system on a ship includes the unit assembly indicated generally by the reference character T and the unit assembly indicated generally by the reference character S, both of which are operatively associated with the ship's propeller shaft, a portion of which shaft is schematically shown and identified generally by the reference character P in FIG. 1. The unit T functions to develop a variable polarized voltage directly proportional to the twist and its direction of the shaft P resulting from the application of torque to the shaft, while the unit S generates and delivers a D.C. voltage directly proportional to the r.p.m. or speed of rotation of the propeller shaft. The units T and S are the only units or parts of the system in direct connection with the propeller shaft P, the remainder of the units and components of the system, except for the horsepower indicating, recording and integrating units, being mounted and installed on a panel and torsionmeter panel shown schematically and indicated in its entirety by the reference character TP and a control panel shown schematically in FIG. 1 and indicated in its entirety by the reference character CP in FIGS. 1, 13 and 14.

Operating power for the example system is supplied from a suitable power source (not shown) as 115 volt A.C. current of 60 cycles, to a servo amplifier unit identified in its entirety by the reference character SA in FIGS. 1 and 4.

The step of the method of the invention requiring the development of a variable voltage proportional to the twist developed in the ship's propeller shaft P by the torque developed by the shaft, is carried out in the example system by the unit T operatively associated with the shaft P. Referring now to FIG. 2 of the drawings, the unit T includes a "husk" assembly which includes two (2) tubular sections 10 and 11 mounted in fixed positions rigidly clamped onto the shaft P independently of each other and spaced apart axially along the shaft, so that these sections 10 and 11 are movable angularly or peripherally relative and in opposition to each other around the axis of the propeller shaft as the latter twists under the torque forces applied to the shaft. Such relative movements between the sections 10 and 11 on the propeller shaft P is utilized to develop a differential variable voltage which relates directly at any instant of operation of the shaft to the torque developed by the shaft at that instant. A transducer-transformer unit 20 is mounted on the sections 10 and 11 in position therebetween as shown in FIGS. 1 and 2. This transducer-transformer unit 20 is of the so-called H-bar type familiar in the art, and includes the coil member 21 and the coil member 22 constituting the poles and the movable H-bar 23 for varying the air gaps between bar member 23 and the coil members 21 and 22 to indicate direction as well as magnitude. Thus with the transducer 20 mounted on the propeller shaft P for relative movements between the coil members 21 and 22 and the H-bar 23 by the torsional twist in the propeller shaft, a differential voltage is developed by the transducer 20 when energized which has a magnitude proportional to displacement and a polarity which is dependent on direction of displacement. And the variable voltage so developed has a magnitude which is also related to the torque exerted in the shaft at any instant and thus provides an accurate signal voltage for shaft torque. The torque signal voltage developed by the transducer 20 is of a low order of magnitude and is measurable in microvolts.

Four (4) slip rings 12, 13, 14 and 15 are mounted around section 11 of the "husk" unit on propeller shaft P and the coil members 21 and 22 of the transducer 20 are connected by the conductors 24a, 24b, 24c and 24d, with such slip rings. A series of four (4) brushes 12a, 13a, 14a and 15a are mounted in positions in sliding, conducting contact with the slip rings 12, 13, 14 and 15, respectively, for conducting therefrom the current delivered thereto from the transducer-transformer 20. A rectifier 16 and a loading resistor 17 are connected across coil member 22, and a similar rectifier 16' and a loading resistor 17' are connected across the coil member 21 of the transducer-transformer 20, such rectifiers 16 and 16' and loading resistors 17 and 17' being connected in a conductor 18 across the coil members 21 and 22. The conductor 18 connects into brush 14a and slip ring 14 on the "husk" section 11. The voltage developed by and delivered from the transducer 20 is rectified and delivered as a D.C. voltage.

The shaft mounted transducer 20 is energized and operated by A.C. voltage from the stepdown transformer ST mounted on the torsionmeter panel unit TP. The transformer ST receives 115 volt A.C. current of 60 cycles by the power lines L1 and L2 to step the voltage down for operating the transducer-transformer 20. The transformer ST is not only a voltage reducing, but is also an isolation transformer. The secondary of the transformer ST is connected into the transducer 20 by a conductor 25 through brush 12a and slip ring 12 to one end of the coil member 21 of the transducer. The coil member 21 is connected to coil member 22 by the conductor 21a, and the coil member 22 is connected at one end to brush 13a and slip ring 13 by the conductor 22a.

A transducer 30, similar to the voltage developing, shaft mounted transducer 20, is mounted on the torsion meter panel unit TP. The transducer 30 includes the coil member 31 and the coil member 32 spaced therefrom with the H-bar 33 mounted therebetween for relative movements between such H-bar and the coil members 31 and 32 to vary the air gaps therebetween for functioning of such type of transducer in a manner well understood by those familiar with such transducers. The power for energizing and operating the transducer 30 is supplied from the step-down transformer ST by the conductor 26 connected into one end of the coil member 31. The opposite end of coil member 31 is connected into a conductor 27. A conductor 28 connects conductor 27 with brush 14a and slip ring 14 on the "husk" unit section 11. A rectifier 27a and a loading resistor 27b are connected across coil member 31 and a rectifier 28a and a loading resistor 28b are connected across coil member 32 of the transducer 30. An additional resistor 16a is connected across the loading resistor 27b for coil member 31 and an additional resistor 17a is connected across the loading resistor 28b for coil member 32 of the transducer 30. These added resistors 16a and 17a change the sensitivity ratio between the transducers 20 and 30 from 1-to-1, to 1.22-to-1 and thereby develops a relative wider deflection of the torsion meter panel drum TD and produces better resolution in the multiplying potentiometer PP illustrated in FIGS. 1, 4 and 14, the drum TD and potentiometer PP being described and explained in detail hereinafter. Clips or switch members 29 are connected in the circuits to the additional resistors 16a and 17a for operation to open such circuits when it is desired to cut-out such resistors to restore the 1-to-1 ratio between transducers 20 and 30. The clips 29 are operable to close the circuits to resistors 16a and 17a when it is desired to activate such resistors to establish the 1.22-to-1.00 ratio between transducers 20 and 30. Coil members 31 and 32 are connected at one end thereof by conductor 31a and coil 32 at such end is connected to brush 13a and slip ring 13 by the conductor 32a.

The single lines to and from panel transducer 30 is a block diagram type and carries the two conductors which supply power to element 20 entering from the power section to the magnetic transducer 30 into the torsionmeter panel through the conductor leading from the power section to the magnetic transducer in the panel by conductor 32a. The input power is fed only into the torsionmeter panel, from there, it is further conducted through cable 32b between the torsionmeter panel transducer to the transducer on the husk located on the ship's shaft.

A galvanometer G is mounted on the torsion meter panel TP and is energized and operated by the differential voltage between the transducers 20 and 30 through the conductors 27 and 24e. The conductor 24e leads to and is connected with brush 15a that is in contact with slip ring 15. The differential voltage developed between the shaft mounted transducer 20 and the panel mounted transducer 30 actuates the galvanometer to indicate in the degree of voltage gradient. The differential voltage delivered to the galvanometer G, having been A.C. is rectified in rectifiers 16 and 16′ and 27a and 28a, to become a D.C. voltage and this rectified voltage deflects the pointer of the galvanometer to the left or to the right, depending upon the direction and the magnitude of the deflection, the latter equivalent to the total amount of torque exerted in the propeller shaft P.

The panel mounted transducer 30 functions for calibration and is operated with a divisionally marked drum TD to match or to an adjusted position in balance with the shaft mounted transducer 20 so as to have the galvanometer reach a null point. The drum TD is provided with a dial therearound and the reading quantity of divisions on the dial drum TD at the null point reflects and indicates the torque or angular twisting force in the shaft when the stiffness of the shaft to resist twisting forces, known as "modulus of rigidity," is taken into consideration and account. In the system of the selected example hereof the scale on the dial drum TD is divided into two hundred (200) equal divisions.

The torsion meter dial drum TD is mounted on a shaft section 40 on the panel TP. This shaft section 40, referring now to FIGS. 1 and 3 of the drawings in connection with the schematic showing of such shaft 40 in FIG. 4, is operatively coupled with the H-bar 33 of the transducer 30 by a male and female precison thread lead screw unit 41 (see FIG. 1) for effecting longitudinal or in and out displacement of the H-bar in the transducer 30 by rotation of shaft 40. In the example system hereof, with the foregoing arrangement of mechanisms and components, one complete turn of the torsion meter drum TD will, through the precision thread lead screw unit 41 move or displace the H-bar 33 a distance of 0.50″. Since the scale on and around the torsion meter drum TD is divided into two hundred (200) divisions, rotation of the torsion meter drum through one division will effect axial or longitudinal movement or displacement in and by the lead screw unit 41 through a distance equal to 0.00025 of an inch, which is equivalent to twenty-five hundred thousandths of an inch. In accordance with my invention the shaft section 40 is automatically rotated to thereby position H-bar 33 of transducer 30 and simultaneously and correspondingly rotate the torsion meter dial drum TD, by a suitable servo system which forms a part of my present invention and which will be referred to hereinafter in detail. In the general functioning of a system of the invention, such as the example system herein disclosed, the H-bar member 33 of the transducer 30 is operated through the medium of the servo system to displace this H-bar a distance and in a direction to balance the shaft mounted transducer 20 to thereby establish a minimal or zero differential voltage and bring a null reading on the galvanometer G. When twist of the propeller shaft P takes place as a result of the torque exerted in the propeller shaft, the transducer 20 develops a voltage signal polarity and of a magnitude proportional to the degree or magnitude of such twist and by the system of the invention this torque voltage signal initiates and causes operation of the servo system to balance transducer 30 with transducer 20 and thus cancel the differential voltage and establish a null condition which is indicated by the galvanometer when the pointer reaches center position. This servo system actuated and controlled balancing of the transducers 20 and 30 effects rotation of the shaft section 40 and of the torsion meter drum TD, so that the total number of scale divisions from zero or cumulative from one null position to another through which drum TD is rotated will visually indicate and may be read as the torque or twisting force relative to angular twist existing in the propeller shaft P at that instance.

A servo amplifier SA is mounted in the control panel CP, referring now to FIG. 6 in connection with FIG. 4 and is supplied with power by power supply PA by the conductors 35a, 35b, 35c, 35d and 35e. This servo amplifier SA is operated by the very low signal D.C. voltage delivered to the galvanometer G from the unbalanced shaft mounted transducer 20, and the polarity of this voltage determines the time-phase relationship in the servo amplifier and, as will be hereinafter referred to more in detail, determines the correct and opposite rotation direction of the servo motor SM to drive the torsion meter drum TD and the panel mounted transducer 30 in the opposite direction to a null point when placed in electromagnetic balance with the shaft mounted transducer 20.

The low D.C. input or torque signal from the galvanometer G is fed into the servo amplifier SA by the conductors 36 and 37 through a low frequency by-pass filter C1 comprised of the condenser 76a and the resistor 77b, as will be clear by reference to FIG. 6 of the drawings. This low frequency by-pass filter C1 filters or shorts out any stray alternating current components that may be superimposed on the D.C. voltage and which may produce undesired signals and erratic operation of the servo motor SM.

The magnitude of the D.C. signal voltage representing torque at the terminals of galvanometer G is very small and in accordance with my invention I convert the filtered D.C. voltage fed to the servo amplifier SA from the galvanometer G into a square wave A.C. voltage for higher and more efficient amplification. In order to carry out this conversion I provide a mechanical synchronous modulator, known and familiar in the art as a "chopper" which is identified generally in the drawings by the reference character CM. The mechanical synchronous modulator CM is of the vibrating-reed type in which the reed is caused to vibrate synchronously to and by an electromagnetic coil which is energized and excited with a magnetic field by the 115-volt, 60-cycle alternating current supplied by the power supply unit PA. By the use of A.C. current there are produced stabilized operating characteristics for the modulator. The alternating current output from the modulator or chopper CM has a square wave form and at synchronous frequency has the same frequency to that in the magnetic coil of the modulator, namely, 60-cycles. In order to insure operation of the reed at the same frequency as the exciting current, there is built into the modulator CM a polarized field which is generated by a permanent magnet.

The mechanical modulator or chopper CM has certain unusual properties such as a "zero time switch" current which has virtually an instantaneous opening and closing of its circuits. The modulator CM offers substantially no impedance to the voltage and currents through its transfer contacts and therefore does not introduce any changes other than in wave forms.

The invention contemplates and includes the use of any suitable electronic type modulator or "chopper" in place of and as the broad equivalent of the mechanical type of "chopper" here disclosed as a component of the combination making-up a system of the invention.

In FIG. 7 of the drawings there is disclosed schematically the network and its connections, making up the power supply unit PA of the system. An A.C. current of 115-volts, 60-cycles, is supplied to the unit PA by the conductors 401 and 402 which lead into the primary 405 of the power transformer 400. This 115-volt power current is necessary to energize the servo amplifier SA which servo amplifier supplies the voltage for energizing the control winding 50 of the servo motor SM to actuate such servo motor in relation to the input voltage signal fed to it. The input signal that is fed to the servo motor from the servo amplifier SA is the differential voltage between the propeller shaft mounted transducer 20 and the panel mounted transducer 30, all as will be more fully described hereinafter. And in addition, a D.C. current supply is necessary for the plate circuit of the electron tubes employed in the system and for the initial voltage to a Zener diode which is utilized in a check test circuit to be hereinafter identified and described.

In the power supply unit PA the power conductor 401 is connected directly into the primary 405 of the transformer 400, while the conductor 402 is connected to the other end of the primary 405 through the fuse unit 403 having connected therewith the neon blown fuse indicator 404. From this fuse and blown fuse indicator unit 403–404 conductor 402a leads to the primary 405 of the transformer 400. The transformer 400 is in this example system of a standard power supply type to produce through its center tap secondary windings the low filament voltage and the high voltage for the "B" supply source for the system.

The secondary winding 407 of the transformer 400 provides the filament supply current for the system. The center tap for the transformer winding 407 is connected with the conductors 420 and 414 to the negative side of the high voltage circuit and to the ground 417 in order to minimize A.C. voltage hum. The secondary winding 407 supplies the current to the filament elements of the electron tubes and to the mechanical coil of the mechanical modulator or chopper CM for the servo amplifier SA. The voltage supply from the secondary winding 407 is led from this secondary winding by the conductors 412 and 413.

The high voltage, center tapped secondary windings 406 and 406a of the transformer 400 are so designed as to produce full wave rectification for maximum efficiency. The center tap of the secondary winding 406–406a is connected to the negative side of the "B" supply output D.C. voltage through the conductors 421, 420 and 414 and to the ground 417 through the conductor 422. The output of the secondary winding 406–406a is connected to the rectifiers 409 and resistors 408 through conductors 418 and 419 alternately at the same frequency as the A.C. power supply current with the voltage gradient in respect to the center tap conductor 421 and each side of the secondary windings 406 and 406a. The rectifiers 409 and resistors 408 are connected in series and parallel. The rectifiers 409 are all identical and each is of the silicon diode type, shunted by the identical resistors 408 to stabilize the voltage. The conductor 415 for the combined voltage output leads at one side to the resistors 410 in conductor 420 and at the other side to the condenser 411 connected across conductors 414 and 415. Thus there is provided a resistor-condenser input for a stable output voltage. The filter condenser 411 removes a major portion of the A.C. component ripple from the D.C. current to smooth it out.

The network and the components included therein of the servo amplifier SA are schematically shown in FIG. 6 of the drawings.

Referring now to FIG. 6, the differential voltage from the galvanometer G which is produced by a change in torque and reflects the difference in air gap displacement between the panel mounted transducer 30 and the propeller shaft mounted transducer 20, is fed into the servo amplifier SA by the conductors 36 and 37. Conductors 36 and 37 lead to the mechanical modulator CM. Conductor 37 leads and is connected to the input primary center tap position of the modulator and impedance matching transformer identified in its entirety by the reference character 425. A low-pass filter C1 is connected in the circuit comprised by the conductors 36 and 37 and consists of the resistor 77a and the condenser 76a. The low-pass filter C1 thus formed filters out the ripple from the input D.C. voltage signal for acceptance of only a pure and true D.C. voltage signal. Such D.C. voltage signal is carried by conductor 36 to the swinging arm 427 of the mechanical modulator CM. Since the input voltage is a D.C. voltage and of small magnitude, higher efficiency and stability can be obtained by converting this D.C. signal voltage into an A.C. voltage and employing the A.C. servo amplifier SA.

The conversion to the A.C. voltage is to take the input D.C. voltage signal alternately inserting it on one side of its polarity into primary winding 428 of the transformer 425 and next into the primary winding 429 of the transformer. The output of the secondary winding 430 of the transformer becomes a square wave alternating current with its phase relation comparable to the input polarity of the D.C. voltage signal. In order to effect swinging of the arm 427 synchronously from side-to-side to make the alternating connections at contacts 431 and 432, an A.C. electro magnetic coil 433 is connected into the filament current circuit and grounded at 434. This filament circuit has the conductors 435 and 436 connected to the conductors 35a and 35b of the power supply unit PA. The arm 427 of the modulator CM is thus caused to swing alternately at the same frequency as the frequency of the power line. Thus the square wave produced by the modulator CM has the same frequency as that of the input power.

The A.C. electro magnetic coil 433 is mechanically connected to the arm 427 by a suitable linkage which is schematically indicated in FIG. 6 by the dotted line LL. As well understood by those familiar with such mechanical modulators, the swinging arm 427 is usually in the form of a resonant reed.

When the polarity of the D.C. voltage constituting the signal input is reversed due to a change in the direction of torque, the square wave output of the transformer 425 has a time-phase change of 180° electrically and results in a reversal of rotation of the servo motor SM because the reference field winding thereof remains fixed, while the control winding voltage from this servo amplifier SA is changed in time-phase, thereby producing a magnetic field reversal. When a null signal is reached by the galvanometer G, the D.C. input signal is virtually zero, and a truer null point than that of the galvanometer reading since the electrical signal zero has no mechanical friction, whereas the pointer of the galvanometer G has air and bearing friction.

The output signal voltage of the secondary winding 430 of the transformer 425 is introduced into the buffer condenser 436 and the gain control potentiometer 437 from which the desired magnitude for degree of sensitivity is fed to the conductor 438 to the grid of the pre-amplifier electron tube 439, constituting the first stage of amplification. The conductor 440 leads to the ground conductor 441 and to the "bonding" conductor 442. The conductor 441 carries the "B" voltage to the plate of the amplifier tube 439, after being reduced through the voltage dropping resistor 443. The screen grid voltage to the tube 439 flows through the conductor 444 after being reduced through the voltage dropping resistor 445 and filter condenser 446. The resistor 447 provides the grid bias with the condenser 448 as a by-pass condenser in parallel, both connected to and terminating in the ground wire 441. The coupling condenser 449 permits only the amplified A.C. voltage signal to pass onto the next stage of amplification to impedance matching resistor 450 and grid resistor 451 into the grid terminal 452 of the amplifier tube 453. The amplifier tube 453 not only functions as an amplifier tube, but also as a phase inversion tube having two separate elements in one envelope of which the phase inversion A.C. voltage is taken off resistors 454 and 455 through the coupling condenser 456 through the conductor 457 to the grid of the other element. This produces two equal amplitude signals out of phase by 180 electrical degrees to the push-pull stage and output control to the servo motor control windings for greater power efficiency and stability. The resistor 458 is the grid bias for the electron tube 453, while the plate circuits are energized through conductor 459 and through voltage reducing resistors 460 and 461, one in each plate circuit through the conductors 462 and 463.

Resistor 464 is a voltage reducing resistor in the "B" current supply through the conductors 465 and 466 to the amplifier tube 439, and the condenser 467 is a filter condenser to reduce the ripple in the A.C. "B" voltage current supply.

Condensers 456 and 469 are coupling condensers to allow passage of only the A.C. amplified signal into the push-pull stages of the network. Resistors 470 and 471 are the grid resistors to the push-pull tube 472 and 473, respectively. The resistor 474 is a resistor that is balanced against the resistors 454 and 455 of which the grid bias resistor 477 is connected in between, with the bias resistor 477 common to the cathodes of both of the push-pull tubes 472 and 473. The conductor 478 ties in the screen grids of both of the push-pull tubes 472 and 473 and in turn is energized from the "B" supply voltage through the voltage drop resistor 479. The "B" supply voltage is conducted by the conductors 492, 465 and 466 to the positive polarity of this "B" voltage supply.

Connected to the voltage of the tube 473 is the feed back circuit conductor 482 to condenser 483 and resistor 484 and connected through conductor 485 to terminal 452 of the grid control of the first element of the tube 453. The inclusion of the feed back system is for the purpose of taking a portion of the output signal and reapplying it to the preceding stage, but with an opposite phase relationship to the original signal to cancel out distortion signals and obtain a true output signal. Further, the feed back system reduces changes in voltage output caused by variation in line voltage and in circuit constants.

The plate output of tube 472 is connected to one control winding in the servo motor through conductors 487 and 488 and to the terminal 488a, while the other plate output of the push-pull tube 473 is connected by the conductor 489 to the terminal 489a. These plate circuits are connected to the "B" voltage supply through the conductors 466, 465, 490, 491 and center tapped between plate condensers 493 and 494.

The plate signal voltages alternately flow from each tube 472 and 473 through their respective control field windings of the servo motor SM between terminals 465a and 489a and between terminals 465a and 488a with true phase relationship depending upon the input signal polarity at terminals 36a and 37a for servo motor direction of rotation, in consideration of a fixed reference voltage in the other phase winding of the servo motor. The magnitude of the driving voltage of the servo motor SM is the A.C. component between terminals 465a and 489a and 465a and 488a.

The servo motor SM is mounted on the control panel CP and is of a two phase alternating current induction motor type having a solid squirrel cage rotor and two field windings for two different field phase voltages 11 and 12. With such a servo motor rotation can only be accomplished by two voltages out of phase (in quadrature to each other) and when these induce currents in the rotor, the armature rotates. Referring now to FIG. 4 of the drawings in particular, the control winding 50 is supplied with the amplified A.C. current developed by the servo amplifier SA through the conductors 51, 52 and 53, with conductor 52 being a center tap to the coil. The field coil of the servo motor SM is identified in FIG. 4 by the reference character 54 and is supplied with fixed energizing and exciting 115-volt, 60-cycle A.C. current by the conductors 55 and 56, which, as will be explained hereinafter, receive such 115-volt current from the power supply PA.

The field or reference coil or winding 54 is connected directly to the line voltage of 115-volts A.C., while the control winding is connected to the output of the servo amplifier SA with impedances to match the amplifier output and may be fed through or around condensers to effect out-of-phase relationship to the reference voltage. An optimum condition is 90° out-of-phase voltage between control and reference windings for either direction of rotation. It is to be noted that the angular speed of this field is a direct function of the alternating current frequency and an inverse function to the multiple number of field poles in the field windings. The direction of rotation is governed with respect to a leading or lagging phase voltage of the control winding to that of the reference voltage.

The torque output of the servo motor SM of the example system hereof is very small and in this instance may be considered to be rated at less than 10 watts. In order for the servo motor SM to operate efficiently the rotor thereof must rotate freely under all loading conditions at a relatively high speed and must never operate at less than 50 percent of its rating. When the servo motor SM is overloaded, when driven against the limit, and if no slipping was allowed, the rotor would stop and continue to exert torque which is known as "stall torque." In ordinary two phase motors, a reversal of motor direction is accomplished by reversing polarity of the voltage in either one of the phases, but in the system of my invention, in accordance with the present example, only the control phase voltage is reversed by a change in phase shift when the input voltage polarity is changed when direction of torque is reversed.

The servo motor SM exerts a torque that is proportional to the product of the currents in the two field coils, and since the reference is fixed, the torque of the servo motor is proportional to the control field current which is in turn proportional to the magnitude of the input signal from the galvanometer circuit after amplification. The direction of rotation of the servo motor SM is governed and controlled by the polarity at the galvanometer G, which changes as the torque changes direction from the magnitude. When there is no change in torque, the servo motor SM remains stationary. In this example system the servo motor SM requires the reduction gears 61 to increase the instrument torque drive while decreasing the speed of operation in the same ratio.

The reduction gear unit 61 reduces the high speed of the servo motor SM to a low speed to develop a high servo motor output torque. In this example reduction gear unit 61 has a step-down ratio of 700-to-1 so that theoretically the output torque developed should be of the order of 700 times greater than the torque of the motor rotor or armature.

A slip clutch 61a is mounted in the shafting 62 and operates when the servo mechanism is driven against the limit stop or when either the servo or torsion meter sections fail. This is a conventional slip clutch unit of the type in which there is no adjustment and under normal operating conditions in the example system this slip clutch 61a should have indefinite life.

The servo motor SM drives a shaft 60 which is connected into drives a set of reduction gears 61 which at its output side is connected to and drives a shaft section 62 which is connected with and drives the shaft 40 on which the torsion meter drum TD is mounted. Shaft 40, as hereinabove explained, is connected with the H-bar member 33 of transducer 30 through the precision thread lead screw unit 41. Thus, the servo motor SM is rotated as a result of and to an extent and direction as determined by the torque signal voltage developed as a differential voltage between the shaft mounted transducer 20 and the calibrating, torison meter panel mounted transducer 30, by the amplified current developed in the servo amplifier SA. This amplified current then flows to the control windings 50 in the servo motor through the supply conductors 51, 52 and 53 from the servo amplifier SA.

A servo drum SD is mounted on and rotated with the shaft 62 between the reduction gear unit and the torsion meter drum TD on shaft 40. The servo drum SD is provided with a scale on and around its entire periphery thereof. The scale is divided into two hundred (200) divisions, as is the scale on the drum TD. These scale divisions are used to represent torque in terms of movement in divisions, which reflect linear motion of the H-bar 33 in the transducer 30 to produce a null point. After shaft calibration, since the stress-strain curve is linear, an average torque in pounds-feet can be assigned equivalent to each scale division. With such information, a torque reading can be obtained directly by multiplying the reading in divisions by the torque value per division.

For the purpose of aligning the drums TD and SD together on the in-line shafting on which they are mounted, a zero adjuster ZA diagrammatically shown in FIG. 14 in the form of a micro-adjuster screw, is provided. When alignment of the drums TD and SD is required, the zero adjuster ZA is operated for positioning both drums so that their scales have the same reading against their respective index lines.

The conductor 56 of the reference field coil 54 of servo motor SM is connected into and through an On-Off switch unit 63 for the servo motor. This switch unit 63 is utilized to open the circuit through the reference field coil 54 in the event that the servo motor rotation is to be discontinued temporarily for carrying out a manual operation to be hereinafter described. The switch unit 63 also controls a servo motor alarm light 64 which is connected in a conductor 64a from switch 63 which automatically lights when the switch unit 63 has been operated to a position temporarily cutting off the servo motor SM with such motor inactive and out of operation. The power is conducted to the switch through the conductor 65. This conductor 65 is connected into the conductor 66 which, with the conductor 67, lead and are connected into the fuses FF and from the fuses FF to the power-on switch unit 68. Conductors 70 and 71 are connected into the service or input side of switch 68 and complete a circuit through a long-life lamp 72. This lamp 72 is positioned in the cabinet or control panel CP and heats the internal volume of the cabinet to prevent condensation therein, particularly when the cabinet or panel is installed at moist locations such as frequently presented by shipboard installations.

An alarm relay identified as a unit by the reference character AR is mounted on control panel CP and is connected to the conductors 51 and 53 of the amplified current circuit to the control windings 50 of the servo motor SM, by the conductors 73 and 74. Conductor 74 leads and is connected into a full wave rectifier 75 to which conductor 73 also leads and is connected. In the conductor 74, ahead of the rectifier 75, there is connected a condenser 76 to block out any D.C. components and allow only A.C. components to enter the relay unit AR. A multiplier, or current reducing resistor 77 is connected in conductor 74 between the condenser 76 and the low voltage relay 75 which relay is also connected into a high voltage control circuit. The A.C. current delivered to the rectifier 75 is rectified thereby to D.C. current which enters the relay coils 78 of the relay unit 75 and operates the relay armature 79 connected with the conductors 80 and 81. Conductor 81 leads to and is connected in the power supply unit PA. A power amplifier unit 81a is connected in the conductor 81 ahead of the connection of this conductor in the power supply unit PA. An alarm light 82 is connected into the conductor 80 and lights up upon the closing of the circuit therethrough by operation of the relay unit AR. The relay unit AR functions to close the circuit through the alarm light 82 when the voltage reaches a maximum in the event that the servo motor SM fails to restore the galvanometer G to a null point causing the input signal to remain at a maximum voltage to produce a peak output in the conductors 73 and 74 which causes energization of the relay coils 78 and actuation of the armature 79 to close the circuit through the light 82.

The unit assembly S which is the source that generates and delivers a D.C. voltage signal directly proportional to the speed of rotation or r.p.m. of the propeller shaft P, includes the D.C. tachometer generator TG of the type having a permanent magnetic field. The D.C. output voltage of this tachometer TG is exactly proportional to the speed of rotation of the propeller shaft P and produces a linear voltage curve for either shaft direction. A D.C. tachometer generator is used in preference to one of the A.C.

type because, by generating a D.C. voltage the problems of frequency and phase relationship and all of the other detriments of A.C. current with respect to measurements, are eliminated and avoided. This tachometer generator TG is directly driven from the propeller shaft P by the set of gears 80 and 81, as shown schematically in FIG. 1 of the drawings, the gear ratio being 3-to-1 in order to drive the generator at a higher rate of speed. This tachometer generator TG generates at the rate of approximately 24 volts for each 1,000 r.p.m. In series with the D.C. voltage output of the generator TG are the resistors 82 and 83, referring now to FIG. 5 of the drawings, which are connected in parallel, the resistor 83 being of the variable or adjustable type. The resistor 83 is of the temperature sensitive affected type which has a negative temperature coefficient of resistance that changes its resistance with changes in the temperature to which it is subjected. This combination will automatically compensate for output voltage reduction from loss in magnetism since as the temperature increases, the magnetic flux decreases and the winding resistance increases with the temperature increase. As the temperature increases, the output voltage is reduced in relatively small amounts proportional for each degree of temperature rise. When the temperature increases, the resistance of the resistor 83 decreases so that the voltage drop across the resistor 82 is decreased, allowing a higher voltage from the generator TG to compensate for the drop in voltage caused by the increase in temperature. Hence, the net result from this temperature compensator, combined with the generator TG, is that the voltage is unaffected by the changes brought about by the temperature variations. A condenser 84, still referring to FIG. 5, is connected across the conductors 85 and 86 of the output voltage from the generator TG, for the purpose of shorting-out any A.C. or transient A.C. currents that may be induced by the generator, or that may be picked up as stray voltages from other conductors running parallel to those in the D.C. generator TG leading to the control panel CP. The output voltage from the generator TG is led by the conductors 85 and 86 into the terminals 85a and 86a and from the terminals 86a and 85a by the conductors 87 and 88 in FIG. 4. Referring to FIG. 4, the conductor 87 leads and is connected into the tachometer calibration potentiometer 90. This potentiometer 90 is adjustable for obtaining the correct voltage from shaft speed of rotation or r.p.m. reading in the shaft r.p.m. meter 91, the slide-arm 90a of the potentiometer 90 being connected by the conductor 92 into a double pole, double throw switch 93 which is connected into the shaft r.p.m. meter 91. A resistance 94 is connected into the conductor 92 between the potentiometer 90 and the switch 93 and functions as a voltage multiplier for the shaft r.p.m. meter 91. The shaft r.p.m. meter 91 is included in the system only for information purposes. In most instances the use of the double pole, double throw switch 93 will be satisfactory.

The tachometer calibration potentiometer 90 simultaneously feeds the correct voltage with respect to the shaft r.p.m. meter 91 into the precision potentiometer identified in its entirety by the reference character PP by the conductor 95 through the switch unit identified generally by the reference character 96, in FIG. 4. It is to be noted that the conductor 95 is common to both the meter 91 and the other side of the precision potentiometer PP. And at this point it is to be further noted that the polarity of the tachometer generator TG into the control system must be correct so that the shaft r.p.m. meter 91 will read up-scale in the ahead rotation when the switch 93 is thrown to ahead position and the ship's shaft is rotating in the direction to propel the vessel ahead.

A check meter 97 is included in the system and has the circuit thereto provided by the conductors 97' and 98 which connect this check meter into the push button switch unit 99. A shaft horsepower check meter calibration potentiometer 100 is connected by the conductor 101 into one side of the switch unit 99 with the slide member 100a of this potentiometer connected to ground by the conductor 102. A voltage multiplier resistor 103 is connected in conductor 101 between switch unit 99 and the potentiometer 100 so that this meter multiplier resistor 103 is in series with the potentiometer 100 and a circuit is completed through the grounded conductor 102 to the checkmeter. The other side of the check meter 97 goes to conductor 97' through the switch unit 99 to the conductor 104 through a switch unit 105 when the switch is thrown into position for operation of the check meter and then through the conductor 106 to the precision potentiometer PP into which it is connected for a functioning and purpose to be hereinafter described. When push button switch 99 is thrown downward to test voltage position, the Zener diode test voltage is fed into the check meter for test voltage verification through conductor 220a and meter multiplier resistor 225, conductor 247 to potentiometer 223, on the other side through conductor 221.

When the switch 105 is in the position indicated in FIG. 4 of the drawings, the voltage from the precision potentiometer PP passes through the conductor 106 through the switch unit 105 and from this switch through the conductor 107 into a calibration potentiometer 108. The potentiometer 108 has the adjustable slide member 108a which is connected with the conductor 109 having therein the voltage multiplying resistor 110. The conductor 109 leads to and is connected into the operating circuit of the horsepower indicator and recorder unit identified generally by the reference character R through the terminal 109a in FIGS. 4 and 5. This indicating and recording instrument or unit R will be further identified in detail and described and explained as to structure and functioning hereinafter. The other terminal side of the indicating and recording element in instrument R is connected into the power conductor 35d (FIG. 4) from the power supply unit PA by the conductor 111.

The two variable signal voltages from the units S and T representing r.p.m. and torque, respectively, operate upon the precision potentiometer PP and carry out what may be termed a mutiplying process. Following the principles of the method and system of my invention a multiplying process is performed by the precision potentiometer PP operated upon by two variables, the input voltage across the extremity terminals of this potentiometer and the rotary positioning of the movable member of slide arm thereof, so that the product of this multiplying process is the result of relative multiplying and, conversely, dividing of the torque exerted at any instant in the propeller shaft P and by the r.p.m. of the propeller shaft P at that instant and by a constant which may be designated K. In this example the movable member or slide arm of the potentiometer PP is positioned by the servo motor SM when it rotates the servo drum SD and returns the pointer of the galvanometer G to the null point, and the slide-arm of the potentiometer becomes angularly displaced precisely to the same degree as that through which the servo drum is rotated. As will be hereinafter more fully explained, the voltage from the tachometer generator TG is connected to the outside terminals of the potentiometer PP to furnish the voltage for functioning and operation of the precision potentiometer. The output voltage gradient from the potentiometer PP depends upon the magnitude of the voltage generated by the tachometer generator TG reflecting the speed of rotation or r.p.m. of the propeller shaft P and as a proportion of this voltage of the slide arm position of the potentiometer, the slide arm position reflecting the torque exerted in the propeller shaft. Thus these two factors result in an output voltage which is the product of the two variables. As an example, if the r.p.m. reading is 50% of full scale reading, then the tachometer generator TG will produce a voltage 50% of full scale output. If a torque is exerted which is 60% of its full scale rating, then the slide arm of the precision potentiometer PP will become correspondingly positioned up-scale. Thus the voltage output from the potentiometer PP becomes proportional, that is, 60% of the input voltage, or 60% of the 50% voltage to effect 30% of the full scale shaft horsepower reading.

The precision potentiometer PP is used in conjunction with the servo system which includes the servo motor SM to accomplish the multiplication function as referred to above, that is, the torque multiplied by the r.p.m. of the propeller shaft P and in turn multiplied by a constant of which the resulting product is in horsepower delivered by the propelller shaft P.

Referring now to FIG. 4 of the drawings, the center tapped precision potentiometer PP includes a section A identified generally by the reference character A and another section similar to the section A, identified generally by the reference character B. Section A includes the resistances 200 one-half of which provides the ahead portion AH thereof and the other half of which provides the astern half AS thereof. A slide member 202 is provided for section A and is movable therealong in contact with the resistances 200 which form section A. The movable slide member 202 is mechanically coupled with the shafting 62 from and driven by the servo motor SM. The section B of the precision potentiometer PP is generally similar and mechanically coupled to the section A and includes the resistances 201 one-half of which provides an ahead portion BH and the other half of which provides an astern portion BS with a movable slide member 204 in contact engagement with and for movement across the resistances of potentiometer section B. The slide member 202 of section A and the slide member 204 of section B are mechanically connected with and driven by the shafting 62 from the servo motor SM by means of gear 62a on shafting 62 in driving mesh with gear 62b on shafting 62c which is suitably connected with the slide members 202 and 204 for simultaneously moving such slide members, all as schematically shown by FIG. 1 in connection with FIG. 4. The slide member 202 of the section A of potentiometer PP is connected to and in conducting relation with the conductor 106 from the switch unit 105. The slide member 202 of section A of potentiometer PP is slidable across the resistances 200 of section A to develop the voltage drop to produce a voltage output with respective polarity for either in the ahead or the astern direction. Resistors 205 and 206 are connected across and in parallel with the resistances of the ahead portion AH and similar resistances 205 and 206 are connected across and in parallel with the resistances of the astern portion AS of section A to provide a corrective network for the potentiometer PP. While the precision potentiometer PP has absolute linear characteristics are changed when the indicating and recording instrument R (FIG. 5) is connected in parallel in the circuit of the potentiometer PP so that an error is introduced by paralleling the recorder circuit resistance to that of the potentiometer PP. In order to overcome this error which directly affects and changes the linear characteristics of the potentiometer PP, the corrective network, consisting of the resistors 205 and 206 for the ahead portion AH and the astern portion AS of the resistances 200 making up section A of this precision potentiometer PP are connected across such portions of section A. Actually, the networks so provided are not corrective networks, but are rather error introducing networks developing errors acting in a direction opposite to the direction of the error caused by the introduction and connection of the indicating and recording instrument R into the circuit to section A of the potentiometer PP. For instance, when the instrument R is introduced connected in parallel to a low resistance value of the potentiometer PP which exists when the slide member 202 barely moves from its position at the connection of the center tap conductor 207, then the external circuit has little or no effect on the potentiometer circuit, but, as the slide arm 202 moves up-scale, the error from paralleling becomes more pronounced. Hence, by the introduction of the so-called corrective networks, the invention provides for the production of an equivalent error in the lower resistive section similar to that caused by the introduction of the instrument R into the network in the upper section of the potentiometer PP. Further, by reducing the introduced error by a different resistance in a lesser degree at the larger displacement, the net result is the maintenance of a linear output for the potentiometer circuits. For example, between the center tap 207 and the terminal 208 which is the center tap and 25% tap, respectively, for the ahead half AH of the resistances of section A, the resistor 206 of 15,000 ohms is utilized, whereas, between the terminal 208 and the terminal 209 a resistor 205 is employed having a resistance value of 82,000 ohms. By the foregoing combination there results an absolutely linear output when the overall resistance 200 of section A has a resistance value of 3,000 ohms between the terminals 209 and 210 of this section of the potentiometer.

The section B of the precision potentiometer PP has the slide member 204 and is identical with the section A above described. The resistances between terminals 211 and 212 of section A have a resistance of 3,000 ohms and the corrective resistors 205' and 206' are connected across the ahead half BH and the astern half 202 and 203 of the resistances 200' making up the section B in the same manner and with the same resistance values as those given for the resistances 205 and 206 of the potentiometer section A.

The sections A and B of the potentiometer PP have their outside terminals connected in parallel by the conductors 215 and 216, but the slide members 202 and 204 are not connected in parallel so that they are independent with respect to the instrumentalities which they operate and control. The section B of the precision potentiometer PP is used when the totalizer or integrator unit IT is connected into the system together with the indicating and recording instrument R. The totalizer unit IT (FIG. 5) is operated and controlled from the section B of the precision potentiometer PP, while the indicating and recording unit R is operated and controlled by section A of the potentiometer PP independently of operation and control of the unit IT by section B of the potentiometer. This is a necessary function and operation to prevent large errors which result when trying or connecting the indicating and recording instrument R and the totalizer unit IT in parallel relation for operation from a single movable slide arm or member, such as the slide member 202 of the section A of potentiometer PP, if such section A constituted and was operated as a single potentiometer for the operation and control of the instrument R and the unit IT. Further, by the foregoing arrangement of the invention, either the indicating and recording instrument R or the totalizer unit IT may be removed from the system without introducing error into that instrument or unit retained in operative connection in the system. This permits of removal of either instrument R or unit IT for service purposes or for disconnection and removal when either is not required for any reason.

When a dual potentiometer such as the precision potentiometer PP is used instead of a single potentiometer, the tachometer generator characteristics are slightly changed.

When the direction of rotation of the ship's propeller shaft P is changed, the slide members 202 and 204 of the potentiometer move to the other side of the center taps 207 of section A and 207' of section B, thereby reversing the polarity of the output. Simultaneously, the tachometer generator TG, having a fixed magnetic field, reverses direction and polarity to the direction and polarity of the potentiometer, causing the output to be again reversed so that the polarity is correct for up-scale reading of the meter.

Thus the magnitude of the torque delivered by the propeller shaft P is reflected by the position of the slide arm 202 of the potentiometer PP, through displacement of such slide arm by the action of the servo motor SM through the reduction gears 61, when the torsion meter drum TD is rotated to a position at which the galvanometer G is at a null point. The relative torque shown on the servo drum SD is then positioned exactly in the potentiometer in respect to both direction and magnitude.

It is to be noted that the potentiometer PP has a center tap 207 which is common in the circuit. The voltage output from the tachometer generator TG is then introduced across both outside terminals of the potentiometer PP, and thus by including in the system the center tap potentiometer PP and utilizing such potentiometer to read zero torque at the center tap position 207, the potentiometer may have one side of the center tap read "ahead" and the other side read "astern" while maintaining the polarity to the indicating and recording instrument R correct at all times. In this manner the indicating and recording instrument R will read up-scale on its indicator scale at all times regardless of the direction of rotation of the propeller shaft P in either the "ahead" or the "astern" direction of propulsion. This is essentially acomplished by the unique arrangement in whic hthe voltage take-off from the potentiometer PP is between the common center terminal tap and the slide arm 202 contact. Hence, when a change in direction in torque occurs and the slide arm 202 moves from one side of the center tap 207 to the other side, a change in the polarity of the output of the galvanometer G takes place. But on the other hand, when a reversal in rotation of the propeller shaft P occurs, it is to be noted that the direction of rotation of the tachometer generator TG also occurs and as a result its polarities interchange and since two polarity changes take place, the output polarity from the potentiometer PP remains the same regardless of the direction of rotation of the propeller shaft P so that the indicating and recording instrument R is operated to always read up-scale. As will be referred to more in detail hereinafter by such steps in a method of the invention, the utilization of the full width with better readability of the chart or record sheet used in the instrument R for horsepower indication and recording for both "ahead" and "astern" direction or rotation of the propeller shaft P is made possible.

A test voltage circuit is based on and includes a Zener diode ZD connected in a conductor 220 that is connected between the check test voltage switch unit 99 and a conductor 221 that is connected between power line 35e from the power supply unit PA to a voltage test calibration potentiometer 222 having the slide arm 223 thereof connected by the conductor 224 into the check test voltage switch unit 96.

When the switch unit 96 is in down position, that is the position of such switch as shown in FIG. 4, and the Zener diode test voltage is not employed, the Zener diode ZD is then loaded through a suitable load resistor 225a to maintain a constant voltage output. Temperature compensation may be provided for the Zener diode ZD but is usually not necessary in view of the fact that it is loaded constantly through the resistor 225a provided for that purpose so that the Zener diode reaches a stable point and maintains a relatively constant voltage output. When the switch unit 96 is in its up position, the Zener diode ZD is put into the "ahead" portion AH of section A of the potentiometer PP, while at the same time the tachometer generator circuit for conducting the generator voltage output to the potentiometer PP is disconnected and rendered inactive.

A check test alarm light 230 is connected in a circuit which includes the conductors 231 and 232 which are connected into the switch unit 96 and which lead and are connected into the power lines L1 and L2 which supply the 115-volt A.C. current to the system. When the circuit formed by the conductors 231 and 232 is closed, the check test alarm light 230 lights, and when this circuit is broken, the light 230 extinguishes. With the switch unit 96 in the down position, as shown in FIG. 4, the light 230 is extinguished, but when the switch is thrown to its up position, the circuit formed by the conductors 231 and 232 is closed and the lamp 230 lights to serve as a signal to remind the operator that the switch unit 96 is in other than its normal position.

The section B of the precision potentiometer PP is connected with, and the output voltage from section B is fed into the integrator and totalizer unit IT by the conductors 233 and 234, the latter conductor being connected with the slide member 204 of section B. This section B is self-compensated for linearity with the same type of corrective network as the network 205 provided for this purpose in section A, as hereinabove explained.

Referring to FIG. 1, the shafting sections 40, 60 and 62 are axially aligned so as to form a straight shaft from the servo motor SM to the H member 33 of the transducer 30, as will be clear by reference to FIG. 14. This straight, in-line shafting has its rotation limited to a maximum of 720° angular displacement, that is, an angular displacement of 360° of maximum rotation on either side of its center zero. This limitation of rotation of the shafting is carried out in the example system by providing a stop means 235 located on the gear box 61 as shown in FIG. 14 of the drawings. The stop 235 is purely schematically indicated in the drawings and is so designed and constructed that the 360° maximum rotation on either side of zero can be accomplished in both the "ahead" and the "astern" rotation of the shafting. Under normal operating conditions the limit stop 235 is not engaged and does not function. Further, this limit stop means 235 does not affect normal manual drum drive operation, at least until the limit stop means is reached by the manual rotation of the drum.

This limit stop means 235 limits the travel of the servo motor gears and prevents overlapping or going into opposite section of the precision potentiometer coil windings as well as fully loading the servo motor SM against the slip-clutch to set off the alarm relay when a system failure takes place.

Referring to FIG. 4, a lamp 236 is connected across the conductors 66 and 67 in a closed circuit for constant burning to illuminate the servo drum SD. The lamp 236 is suitably mounted in position in the control panel CP to clearly light and render easily readable the scale on the servo drum as shown through the front of the control panel, as will be clear by reference to FIG. 13.

A lamp 237 is also connected across conductors 66 and 67 in a closed circuit for constant burning whenever and throughout the time that the power is onto the system through the closing of the switch unit 68.

A normal open micro switch 238 has the conductor 66 connected thereinto and this micro switch opens and closes a circuit therethrough which includes the conductor 66, conductor 239, which leads through a relay coil 240 back to the conductor 67 of which relay 240 may substitute for r.p.m. direction switch 93. An astern lamp 241, preferably amber in color, is connected to and across the conductors 239 and 239a which are connected with the opposite ends of the relay coil 240. The astern lamp 241 is connected in parallel with the relay coil 240.

The micro switch 238 is of the normally open type and this switch is actuated by the cam latch assembly identified in its entirety by the reference character CL as illustrated in FIGS. 8 through 12. This cam latch assembly CL will be described more in detail hereinafter. When the contacts of the micro switch 238 are closed, the circuit through the astern lamp 241 is closed and this lamp is illuminated to indicate that the torque being applied to the propeller shaft P is in the astern direction. When the torque being applied to the propeller shaft P is in the ahead direction, the micro switch 238 is in its normal open position thereby opening the circuit through the astern lamp 241 so that this lamp is extinguished and is not visible to the operator. The astern lamp 241, when illuminated, calls to the attention of the operator that the torque, being then applied to the propeller shaft P, is in the astern direction, and this is particularly important to the operator when the ship is traveling in the ahead direction and astern torque is applied to the propeller shaft to decrease the forward speed of the ship. In the usual ship power plant an astern or reversing turbine is employed so that when the astern lamp 241 is illuminated, it serves as a signaling indication to the operator that the astern turbine is in operation and is applying a reverse or astern torque to the propeller shaft. The relay 240, if utilized in the system, will function automatically to reverse the polarity acting on the shaft r.p.m. meter 91 to also give an indication to the operator when the ship is being propelled in the reverse direction from continuous astern torque. When the astern lamp 241 is illuminated, when relay 240 is not furnished and if the operator wishes to read the astern r.p.m. rotation of the propeller shaft P, he operates the switch unit 93. When the propeller shaft P is being rotated in the ahead direction of rotation, the operator may ignore the switch unit 93 and it will restore itself to correspond to the proper position for the ahead operation, after operating through a period of astern torque and rotation.

The switch unit 99 is of the push button type and its normal position is that shown in FIG. 4 of the drawings, and in order to check the system by the use of the check test circuits included therein as a part of the invention, if a check on the test voltage is required, that is, the output voltage from the Zener diode ZD, then the switch 99 is depressed, bringing the Zener diode circuit into action across the lower contacts of the switch unit which are connected with conductors 220 and 220a, in which latter conductor the multiplier resistor 225 for the check meter 97 is connected. This will result in the indication on the check test meter 97 of the voltage output of the Zener diode ZD through the conductors 97' and 98 which lead to the check meter. Thus this will provide the comparative check test voltage across the external test points 245. The Zener diode ZD is connected between the ground and in series with the voltage dropping resistor 246 which is connected in the conductor 221 which leads to and is connected in conductor 35e of the power conductors from the power supply unit PA to the servo amplifier SA. The voltage output of the Zener diode ZD for a particular voltage setting is controlled by the check test voltage calibration potentiometer 222 which is in series with the output of the Zener diode ZD. Conductor 247 leads from the slide arm 223 of potentiometer 222 to the positive check voltage test point 245 with conductor 220b that is connected into the switch unit 99 and in which there is conductor 220a connected to the resistor 225 being connected into the conductor 247. The conductor 224 leads from the slide member 223 of potentiometer 222 into the check test voltage switch unit 96. When the switch unit 96 is swung into its upper position from the lower position shown in FIG. 4, the test voltage is connected into the ahead portion AH of sections A and B of the potentiometer PP. The value of the resistor 246 in the conductor 221 leading from power supply to Zener diode ZD is calibrated for the proper value to maintain a constant voltage and power output of the Zener diode ZD, and this voltage output should be below the "knee" and the curve of the Zener diode characteristic curve to maintain a constant voltage output. The purpose of the Zener diode ZD is to simulate a fixed r.p.m. as a basis or reference for checking the system. The switch unit 105 is selectively operable for rendering active either the check meter 97 or the indicating and recording instrument R. When this switch is placed in check activating position, the circuit through the lamp 250 which includes the conductor 251 between the switch unit 105 and conductor 66 to power line on the other side to conductor 67 is closed so that this lamp 250 is illuminated to indicate to the operator of the system that the switch unit 105 is in the position in which the indicator and recording instrument R is inactive and out of operation with no record being made on the recording chart thereof. When the switch unit 105 is in the position as shown in FIG. 4, it closes and completes a circuit which conducts the output voltage from the slide arm 202 of section A of the precision potentiometer PP through conductor 106, conductor 107, the recorder calibration potentiometer 108, recorder multiplier resistor 110, and the conductor 109. The potentiometer 108 is adjustable to produce the correct shaft horsepower reading that corresponds to the calculated values with respect to the modulus of rigidity of the shaft. In series with this potentioleter 108 there is a voltage multiplier resistor 110 which is in series with the D'Arsonval meter mechanism of the indicating and recording instrument R. The circuit to and through the meter mechanism of the instrument R comprises the conductor 109 from the potentiometer 108 and the conductor 111 which leads to and is connected with the conductor 35d, a common ground of the power supply conductors from the power supply unit PA to the servo amplifier SA.

Referring now particularly to FIGS. 8 through 12, the cam latching assembly CL is provided for operating the micro switch 238 to illuminate the astern lamp 241 to inform the operator that the torque then acting in the propeller shaft P is in the astern direction. As will be readily recognized, the application of astern torque may be temporary or may take place and continue over a protracted period of time. The astern torque condition is temporary when, for example, the propeller shaft is rotating in the ahead direction and a rapid deceleration or stop may be required. Under such conditions the astern turbine of the ship is put into operation, causing a negative shaft horsepower to be applied into the shaft to stop the ship and reverse direction, or to slow it down, and when such operations occur, the astern lamp 241 is illuminated to advise the operator that the propeller shaft has had and is having astern torque applied thereto.

Since the servo mechanism shafting 40-62-60 on FIGS. 1, 4 and 14, rotates clockwise and counterclockwise each through 360° and thus has a full or complete deflection of approximately 720°, a conventional cam mechanism cannot be used for operating the astern lamp controlling micro switch 238 because such a cam mechanism would repeat itself and effect operation of switch 238 when going from one direction to the other after the shafting has completed rotation through only 180° in one direction. Since only the astern lamp 241 is to be active and illuminated during the astern torque direction of rotation of the servo mechanism shafting, it will be recognized that any such repetitive illumination of the lamp is undesirable; hence, by my present invention I have solved this problem by the cam latching assembly CL of the example thereof as used in the present system of the invention. The cam latching assembly CL is only in latched and operating position to actuate the switch 238 to effect illumination of the lamp 241 when the torque in the propeller shaft P is in the astern direction. When the torque in the propeller shaft P is in the ahead direction, the cam latching assembly CL will be unlatched and inactive to operate the switch 238 to closed position for effecting illumination of the lamp 241. The cam latching assembly includes the circular disc or cam plate 300 which is freely mounted on the shaft section 62 of the shafting driven by the servo motor SM for rotation of the shaft independently of the cam disc when the assembly is in inactive condition of operation. An arcuate latching arm 301 is pivotally mounted by the headed pivot pin 302 on one side of the cam disc 300 in position along and adjacent the periphery of the cam disc 300. Latching arm 301 has its outer edge surface formed on a radius of curvature the same as that of the cam disc 300 so that in one position thereof, being the inactive position of the cam latching assembly as shown in FIG. 8, the outer edge of this locking arm lies substantially in the plane of the peripheral edge of the cam disc 300. One end of the pivotally mounted locking arm 301 is provided with the shoulder 303 at the inner side or edge of the arm, being the upper end of the arm when the latching cam assembly is in the inactive position of FIG. 8.

A pusher arm 304 is mounted on shaft 62 for rotation therewith. Pusher arm 304 is positioned and fixed onto shaft 62 at and immediately adjacent the side of the cam disc 300 on which the latching arm 301 is mounted and with the cam latching assembly CL in its normal, inactive position, the cam disc 300 with latching arm 301, remains stationary while pusher arm 304 rotates with shaft 62 but clear of and out of engagement with latching arm 301 and its shoulder 303 when it rotates therepast. A smooth recess 306 matching the curve of follower roller 309 is provided in the periphery of the cam plate 300. When the cam latching assembly CL is in its inactive position shown in FIG. 8, the notch 306 is located at the lower side of cam disc 300 and latching arm 301 in transverse alignment. The switch unit 238 is of the micro switch type and includes the switch actuating plunger 307 which, as will be understood by those familiar with this type of switch, is spring loaded and in normal switch open position thereof projects upwardly from the switch unit in the position as shown in FIG. 8. The switch unit includes the resilient operating arm 308 formed of flat spring material. The operating arm 308 extends over and transversely across the outer end of the actuating plunger 307. The roller 309 is mounted on the outer end of this operating arm 308 on the upper side thereof for free rotation thereon. The switch unit 238 is so mounted relative to the cam latching assembly CL that when the cam latching assembly is in the inactive position of FIG. 8, the aligned notch 306 is at the lowermost part of cam disc 300 and latching arm 301 with the roller 309 of the switch operating arm 308 aligned therewith and being projected by arm 308 into position received and seated in the aligned notch and with the switch actuating pin 307 in its projected, switch open position so that the circuit formed by the conductors 239 and 239a is open and the astern lamp 241 is unlit and gives no visual signal.

A pin 310 is mounted on one side of a cam disc 300 in position extending therefrom at a location spaced inwardly from the latching arm 301 and approximately opposite the headed pivot pin 302 when the assembly is in the inactive position of FIG. 8. When the shaft 62 is rotated in the astern direction and the direction of rotation of the pusher arm 304 is thereby reversed, this arm engages and pushes against pin 310 and picks up and rotates the cam disc 300 along and in the same direction with the rotation of shaft 62 and the pusher arm 304.

A pin 311 is mounted and fastened into latching arm 301 adjacent the shoulder 303 and this pin extends transversely through an elongated or arcuate slot 312 formed through cam disc 300 in a generally radially disposed position relative to the axis of the cam disc. On the side of cam disc 300 opposite the side on which latching arm 301 is mounted, a pin 314 is fixed to the disc in position spaced from pin 311 and a spring 315 is connected at one end to pin 314 and at its opposite end to the pin 311 that is movably confined in the slot 312. Spring 315 continuously acts on latching arm 301 in a direction to swivel latching-arm 301 about axis 302 in a direction to swing the back end of latching-arm 301 therein outwardly to the position as shown in FIG. 10.

When the shaft 62 is rotated in the astern direction, as dictated by astern torque in the propeller shaft P, the pusher arm 304 is rotated with shaft 62 to engage against pin 310 and thus rotate cam disc 300 along with shaft 62 in either direction while under astern torque action. This rotation of the cam disc with the latching arm 301 moves the recess 306 from position receiving the switch operating arm roller 309 so that the roller 309 thereafter rides up onto the peripheral or camming edge of cam disc 300 and is thus forced outwardly from the cam center to thereby force switch operating arm 308 to be displaced with resulting depression of the switch actuating plunger 307 to switch closing position. When the switch is closed, the circuit to the astern lamp 241 is closed, and the lamp is illuminated. When the recess 306 is moved clear of roller 309, the tension spring 315 on the cam disc 300 takes over and pulls pin 311 within the slot 312 to its limit which in turn pulls the end of the latching arm 301 having the shoulder 303 therein, inwardly toward the axis of the cam member 300. This results in the pusher arm 304 outward end latching under the shoulder 303 and thus holds these members locked in place during the entire period of astern torque operation.

When ahead torque replaces the astern torque and the shaft 62 has reached a position with respect to the servo drum SD in the ahead direction, then the detent recess 306 moves to a position opposite roller 309, and then under the spring action of arm 308, roller 309 is moved back into the detent recess, and the latching arm 301 is swiveled inwardly which thereby swings the end of the latching arm having shoulder 303 outwardly and releases the pusher arm 304 to unlatched position relative to the latching arm 301 so that the pusher arm 304 is free to rotate clear of the latching arm.

It is to be noted that when the switch cam follower roller 309 is out of the detent recess 306, the pin 311 will slide freely in the slot 312 and functions as the limit stop for both directions of movement of the pin. This, therefore, limits the back end of latching arm 301 from moving excessively outwardly to thereby prevent the roller 309 from coming back into the detent recess. By limiting the travel of the latching arm 301 the end thereof is positioned so that switch roller 309 is not prevented from freely entering the recess by latching arm 301 extended too far outward.

By the foregoing construction and combination of the micro switch 238 and the cam latching assembly CL, the astern lamp 241 is always illuminated during astern torque operation and is always extinguished during ahead torque operation. In this manner the operator is always given a visual signal when astern torque is applied in the propeller shaft and which effects astern torque operation of the servo mechanism and the system in which it is included.

The indicating and recording instrument R is of the type familiar in this art in which a chart C is unwound from a roll (not shown) on which a suitable stylus (not shown) makes a trace CT (see FIG. 5) to record continuously the horsepower delivered by the propeller shaft P in accordance with and as controlled by the output voltage from the potentiometer PP, such output voltage as hereinbefore explained being a product of the torque and the r.p.m. signal voltage fed into the potentiometer. In this particular example the indicating and recording instrument includes the visual indicating scale IS over which index member IM transverses in accordance with and through a displacement proportional to the output voltage from the potentiometer PP. The index member or inking pointer is in this instance actuated by a D'Arsonval type of meter mechanism D which is supplied with the actuating current through the conductors 109 and 111 and the conductor 111a from the center tap conductor 207 of section A of the potentiometer PP to the conductor 111.

The mechanism for moving the chart C is actuated by the usual mechanical clock spring (not shown) which is electrically wound by a suitable electric motor indicated generally by the reference character EM in FIG. 5 of the drawings. This type of mechanical clock spring mechanism and electrical winding of such spring, may be conventional and in accordance with the arrangement of such an electrically wound spring motor familiar to those skilled in the art, and therefore it is not believed that any detailed disclosure and explanation thereof is required herein. The spring winding motor EM is supplied with operating current through a circuit comprised by the conductors 325 and 326 which are connected with the conductors 231 and 232 from the switch unit 96, as will be clear by reference to FIG. 5, in connection with FIG. 4.

Thus, in the operation of the system of the invention as here disclosed, the indicating and recording instrument R is operated to continuously form a trace CT on the chart C as a permanent record of the horsepower delivered by the propeller shaft P during a given period of time as shown on the chart, while at the same time visually indicating on the scale IS the horsepower in the propeller shaft P at any instant.

If desired, the integrating and totalizing unit IT may be included in the system in the form as shown in the present example. In FIG. 5 the integrating and totalizing unit IT is shown as including the timing motor 350 supplied with current by the conductors 351 and 352. Conductor 352 is connected to and forms a continuation of the conductor 234 from the slide member 204 of section B of the potentiometer PP, while conductor 351 leads and is connected to conductor 233 through an adjusting potentiometer 353. The conductor 233 leads and is connected into conductor 234 through a fixed resistor 354. The potentiometer 353 and the fixed resistance 354 control the rotational speed of the motor 350 which is a time-rate D.C. motor which has a linear speed of rotation with respect to time and voltage, that is to say, the motor 350 will make a fixed number of rotations over a period of time for a particular voltage which will represent a function of voltage versus time. The resistor 355 represents the combination of an external resistor and an internal resistance equivalent to motor armature 350 shown in conductor 351 between the motor 350 and the variable potentiometer 353.

Thus, with the foregoing arrangement the voltages are integrated over a period of time to produce an integrated time-voltage output in a digital readout representing shaft horsepower-hours. Since the motor 350 has a very low torque output, it operates through a reduction gear unit 356 to a counter or totalizer unit 357 to produce a voltage-time readout in terms of shaft horsepower-hours. The digital readout provided by the counter 357 is illuminated by a lamp 358 in a circuit comprised of the conductors 359 and 360 which are connected into the power conductors 232 and 231. The calibration for correct readout with respect to speed of the timing motor 350 is carried out through the adjustment of the potentiometer 353. Moving the potentiometer adjustment in one direction produces a higher speed, while moving it in the opposite direction produces a lower speed. By utilizing the foregoing arrangement and method, the integrating and totalizing unit IT can be adjusted and calibrated as to speed with extreme accuracy and precision.

An expression of a control panel CP of an actual installation of a system of the present example of the invention for carrying out the method thereof, is lliustrated in FIGS. 13 and 14 of the invention. Referring to FIG. 13, the front of an actual control panel CP is shown. In the upper central portion of the panel the shaft r.p.m. meter 91 is disclosed with its needle and scale mounted on the front cover of the control panel. The operating handle or knob 401 for the switch unit 91 is mounted in position accessible at the front of the panel and is movable to operate the switch unit 91 for either ahead or astern position to visually indicate the speed of the propeller shaft P of the ship in either the ahead or the astern position. A knob 402 is mounted in position accessible at the front of the panel for operating the servo drum SD manually when the servo drum is disconnected and inactive.

Referring now to FIG. 1 in particular in connection with FIGS. 13 and 14, a manually operable mechanism is provided for rotating and adjusting the servo drum SD manually when this servo drum is disconnected from driven relation with the servo motor SM. As shown in FIG. 1, a bevel gear 503 is mounted on the shaft section 62 of the straight-line shafting from the servo motor to the transducer 30 and a shaft 504 is journaled in position with its axis at right angles to shaft section 62. This shaft 504 has mounted thereon at its inner end a bevel gear 505 in driving mesh with bevel gear 503 and at its opposite, outer end has mounted thereon one multi-jaw section 506 of a clutch unit identified in its entirety by the reference character 507. A shaft 508 is mounted in axial alignment with the shaft 504 and mounts at its inner end the multi-jaw clutch member 509 for clutching engagement with the clutch member 506 on shaft 504. The shaft 508 at its outer end is provided with the manually operating knob HK which, as hereinbefore referred to in a panel installation of a system of the invention is located in readily accessible position at the outer side of the front of the control panel CP. The shaft 508 with clutch member 509 and the operating knob HK is suitably spring loaded as a unit so that in normal position thereof it is spring pressed outwardly with the clutch member 509 out of engagement with the clutch member 506 on shaft 504. When the servo motor SM is in inactive position, an operator may by pressing inwardly on knob HK engage the clutch members 506 and 509 and thus manually rotate the shafting, including shaft section 62, to thereby rotate and adjust the servo drum SD.

The control panel CP is provided with a suitable framed opening 510 therein having an index member 511 through which opening 510 the scale on and around the periphery of the servo drum SD is visually disclosed, as will be clear by reference to FIG. 13. On the right hand side of the framed opening 510 for the servo drum SD, there is provided a framed opening 512 through which the visual markings on the check meter 97 are visible. In the instant example the astern alarm light 241 is made visible through a lens 514 mounted on the front of the control panel CP at the left of the manual control knob HK.

A switch operating member 68a is mounted on the front of the control panel on the left-hand side thereof for actuating the switch 68 of the system for shutting off or putting on the power, and a lens 515 is provided in the panel for visibly showing therethrough the lamp 237 for indicating when the power is on or off. To the right of the switch operating member 68a there is provided the switch operating member 63a for operating the switch 63 to shut off or put on the servo motor SM, a lens 516 being provided in the panel for visibly showing therethrough the lamp 64 when the switch 63 is in position shutting off the servo motor SM.

A lens 517 for the system alarm lamp is provided for displaying therethrough the alarm lamp 82 when the latter is illuminated so as to indicate to the operator the existence of a system failure. To the right of the system alarm lens 517 when facing the front of the control panel CP, there is mounted a switch operating member 105a for the switch 105 controlling the recorder-check meter alarm, and below this switch operating member there is mounted a lens 518 for visually displaying therethrough the alarm lamp 250 when the latter is illuminated. A switch operating member 96a is provided on the control panel CP for operating the selector switch 96 for selective operation to effect normal operation of the tachometer generator TG or to carry out a check test through the medium of the switch 96. A lens 519 is mounted in the panel below switch operating member 96a for visually displaying therethrough the alarm lamp 200 when the latter is illuminated by operation of the switch 96 to carry out a check test.

In FIG. 14 of the drawings an elevational view of certain of the components of a system of the invention in an actual installation thereof is disclosed. Referring now to FIG. 14, it discloses the arrangement by which a straight-line shaft, indicated generally by the reference character 520, is made up from the shafting or shaft sections 40–62–60, and is mounted in position extending horizontally across the interior of the panel at a location intermediate the upper and lower ends or sides of the panel. When facing FIG. 14, the servo motor SM is mounted in the control panel CP on the right-hand side thereof and engages with and drives the reduction gears 61 (see FIG. 4) which mounted in a gear case or box 521. The straight-line shaft unit 520 then extends and is driven from the reduction gears in the gear box 521 and extends by its section 40 from the control panel P to the torsion meter panel TP where it has mounted thereon the torsion meter drum TD and the lead screw unit 41 which engages with the H-bar member 33 of the transducer unit 30. The stop mechanism 235, referred to and described hereinabove, is mounted and positioned on the right-hand side of the gear box 521 and operates and functions to limit rotation of the shaft 520 to 360° in either direction, or a total angular displacement of 720°, as hereinbefore explained. Adjacent the gear case 521 the servo drum SD is mounted on the shaft 520 for rotation by and with that shaft and the index member 511 is mounted on the adjacent side of the gear case 521 for cooperative reference with the scale on and around the periphery of the servo drum.

A bellows unit 523 is mounted in and forms a part of the shaft 520. This bellows unit 523 functions to compensate for misalignment between the shaft sections making up the shaft unit 520. Bearing supports 524 and 525 are mounted in the control panel CP for the shaft unit 520, with the latter journaled therein and extending therethrough. Between the bearing supports 524 and 525 there is mounted in the control panel CP a housing 526 in which there is mounted and received the multi-jaw coupling unit 509 comprised of the shafts 504 and 508 mounting thereon the jaw members 506 and 509 in operative association with the bevel gears 503 and 505 and the manual control knob HK. In FIG. 14, the multi-jaw member 506 on shaft 504 are shown. The shaft 508, jaw member 509, and the manual control knob HK are mounted and carried on the front wall of the control panel CP shown in FIG. 13.

Between the housing 526 and the bearing support 524 for the shaft unit 520, the cam latching unit CL is mounted on the shaft section 62 as hereinabove described and explained. The micro switch unit 235 operated and controlled by the cam latching assembly or unit CL is mounted in the control panel CP in position for operation by the cam latching assembly.

A universal slide connection or coupling, identified generally by the reference character 530, is provided and connected in the shaft unit 520 as a part thereof between shaft sections 40 and 62, as diagrammatically shown in FIGS. 1 and 14 of the drawings. This universal slide unit 530 provides for shaft alignment and allows for transverse motion of the torsion meter drum TD on the shaft section 40 on which drum TD is mounted.

The shaft section 40 extends from the control panel CP to the torsionmeter panel TP where it is connected into the lead screw unit 41 which in turn is coupled to the H-bar member 33 of the transducer 30.

Within the interior of the control panel CP in the form of the selected example, as shown in FIG. 14, the precision potentiometer PP is mounted and positioned at the right-hand side of the gear case 521 for the reduction gears 61, while below the components mounted and assembled as above described, there is mounted the terminal block identified in its entirety by the reference character 531 for connecting the circuits between the components of the system. The long life lamp 72 which is connected on the power side of switch 68 and which is continuously on for maintaining a temperature within the control panel to eliminate condensation within the panel, is mounted in the lower left-hand side of the panel.

The servo amplifier unit SA hereinabove described in detail in connection with FIG. 6, is mounted and positioned in the control panel CP of the selected example installation of the invention, in the upper right-hand portion of the panel as shown in FIG. 14. A sub-panel indicated in its entirety by the reference character 532 is mounted in the control panel CP in a location between the servo amplifier unit SA and the shaft unit 520 with its associated components and mechanisms. On this sub-panel 532 there is mounted the blown fuse indicator 533, an adjustment means 534 for the recorder calibrating potentiometer 108, an adjustment means 535 for the test voltage calibrating potentiometer 222, an adjustment means 536 for the check meter calibrating potentiometer 100 and an adjustment means 537 for the tachometer calibrating potentiometer 90. Also mounted on the sub-panel 532 is the blown fuse indicator 538 for the amplifier power supply PA and the voltage test points or contacts 245 hereinbefore referred to and identified. The push button switch unit 99 is also mounted on this sub-panel 532, with the operating push button 99a located in an accessible and operative position thereon.

In expressing the torsion meter panel TP of the present example system and installation thereof, this panel TP is preferably mounted adjacent to and against the control panel CP on the left-hand side thereof when facing the panels, with the shaft section 40 of the shaft unit 520 extending to and in operative engagement with the precision feed screw unit 41 (see FIG. 1) for operating the H-bar member 33 of the transducer 30. The transducer 30 is mounted in the panel TP along with the shaft section 40 with the torsion meter drum TD thereon and with the galvanometer G also mounted in this panel, as well as the step-down transducer ST with the necessary circuitry connecting the foregoing major electrical components. Also in the preferred expression of the system of this example, the indicator and recorder instrument R is preferably mounted at the left side of the torsion meter panel TP in the immediate proximity thereto, so that the control panel CP, the torsion meter panel TP, and the indicating and recording instrument R are arranged in a completely compact assembly and mounting for ease of operation and reading by an operator from a single operating location. And with this compact assembly, as aforesaid, preferably the tachometer generator TG is mounted and positioned below but in immediate proximity to the control panel CP and the torsion meter panel TP.

In the normal operation of a system of the invention as expressed by the present example when installed on a ship for determining and indicating shaft horsepower output by a propeller shaft of the ship, the indicating and recording instrument R by its indicator scale gives to an operator the instantaneous shaft horsepower output at the particular instant or time of the reading, as produced by the D.C. voltage signal as hereinbefore explained and described. This instrument R has a slow moving, continuous chart C which is actuated by the electrically wound chart actuating clock mechanism EM on which a stylus in the conventional manner makes an uninterrupted and permanent graphic record in the form of the trace CT of the shaft horsepower output over periods of time for future calculations and observation of the ship's operation and efficiencies.

If the total shaft horsepower-hours output is required during a specified period of time to ascertain the fuel consumption efficiency, the areas under the curves can be integrated by adding up the shaft horsepower-hours. The average horsepower for each hour could be noted and where the curve is irregular, a straight, horizontal line should be carefully drawn through the curve to approximate an average. The immediate trace areas above and below this line should be equal in area and each line should not be longer than a chart area, but shorter if periods of less than hours are totalized. In accordance with a system of the invention a horsepower-hour integrator and digit counter readout instrument IT is included in this system so that the counter indicates horsepower-hours and totalizes them as an average that may be read directly. Thus, the horsepower-hours reading may be compared in fuel consumption in pounds and the ratio of fuel consumption to horsepower-hours may be ascertained to determine the relative efficiency of the ship's operation.

If it is desired to calibrate the propeller shaft, such as the shaft P of the present example, for determining its modulus of rigidity, the servo motor SM should be switched "off" and the torsion meter drum TD then operated by hand, using the manual drive 507 and its actuating control knob HK.

Where a permanent record of test calibration is desired, the check switch 99 is placed in check test position which introduces the fixed standard test voltage which is a substitute for and is equivalent to ⅝ of the full rated scale of the r.p.m. meter. The chart C can then be read in terms of torque or horsepower since the simulated speed is fixed and the shaft calibration weights and lever arms are known. The weight in pounds or hydraulic pressure used in the test should be written onto the chart C adjacent to the graph curves after conditions have stabilized. This will provide a permanent record of calibration for future comparison and information.

The control panel CP contains the various alarm lamps and the alarm relay of the system. In order to prevent leaving the various switches of the system in other than normal operating positions for indicating and recording, alarm lamps have been made to operate in combination with the servo motor SM, the check meter 91, and the check test switches 96 and 105. These switches are for temporary use and when placed in the "down" position shown in the accompanying drawings, the alarm lamps are illuminated and remain so until the switches are restored to their "upward" or normal position. Such visual alarm signals act as a reminder to the operator to restore the switches and thus extinguish the alarm lamps before leaving the control panel CP.

The system failure alarm relay AR is an instantly operating external alarm. The system failure relay AR operates the alarm light 82 when a fault occurs in the system and the servo motor SM is driven against the limit stop 235. Under such conditions the servo drum SD is driven off-scale, about 195 divisions either side of zero, and the servo motor continues to rotate and drives against the friction clutch 61a.

When the system fails, the servo motor SM is unable to drive the transducer 30 back to its null point at which the servo motor input signal voltage becomes zero. However, under the foregoing conditions, the control phase signal voltage is at a maximum and remains so until the faulty condition is corrected. In order to call the attention of the operator to the fact that a failure has taken place and exists, the system failure alarm lamp 82 is lighted when the A.C. alarm relay AR trips and closes. It is to be noted that the operating coil 78 of this relay AR is connected through the internal rectifier 75 to the control phase in the servo motor SM. A condenser 76 and a resistor 77 are in series with the relay AR to the terminals for the servo motor SM, the condenser 76 being placed in the circuit to block out any direct current from the A.C. relay AR to thereby prevent spurious or false alarms. The resistor 77 limits the current in the relay circuit to a relatively low voltage so that only voltages above a certain magnitude can operate the armature 79 of this sensitive alarm relay AR. As the relay circuit draws an insignificant amount of current away from the servo motor control phase current which comes from the servo amplifier SA, the power from the servo motor SM is at a maximum at all times.

When the voltage is sufficiently high to operate the armature 79 of the relay AR, the relay contacts are closed to allow current from the power circuit to light the alarm lamp 82.

The r.p.m. meter 91 has been incorporated into the system of the invention for the purpose of indicating the instantaneous revolutions per minute of the rotational speed of the ship's propeller shaft P. This information is necessary, together with the torque readout, only when it is required in order to calculate the shaft horsepower output and is not required when indicating or recording horsepower by the instrument R.

The check meter 97 has been incorporated into the system in the combination as disclosed in order to ascertain, when desired, that the system is functioning properly so that the results of the functioning may be relied upon as correct. The check meter 97 also functions to locate faults in the system. For example, by simulating a particular shaft horsepower and feeding it into the check meter 97, its pointer should align to a horsepower check test calibration line on this meter. If the pointer does not align to this mark, it is an indication that a defect exists. Such a check test should be taken only after the system has been allowed to warm up to stabilize conditions. Such a horsepower check test is made by placing the servo motor switch 63 in "off" position and then manually rotating the servo drum to a reading of 100 divisions in order to simulate a shaft torque of this magnitude. The check meter switch 105 is then operated or displaced downwardly from the position shown in the drawings to the check meter position which directs the potentiometer output from the recording instrument R to the check meter 97. The check test switch 96 causes the test voltage from the circuit of the Zener diode ZD to energize the potentiometer windings instead of the tachometer generator TG. The test voltage used is a fixed D.C. voltage equivalent to and simulates nearly approximately ⅝ of the maximum shaft speed as normally produced by the D.C. tachometer generator TG. As it is impractical to rotate the ship's propeller shaft P at constant full speed at will, this constant voltage output is made available and may be used for this purpose.

In this connection it should be noted that the resultant reading of the recording instrument R will be approximately half way up-scale, which is correct since full speed and one-half full rated torque will produce one-half the full rated horsepower.

It is necessary that the test voltage that is applied to substitute or simulate a fixed and constant shaft speed when making a check test, must be of the same magnitude and polarity whenever called upon for test. This test voltage must be unaffected by line power voltage variations. A standard cell or batteries are cumbersome, short-lived, and unreliable so that in accordance with the invention a Zener diode circuit is combined into the general network circuits of this system so that a very stable voltage is obtained which has a maximum error of .5 percent even though the line voltage is at maximum tolerable variation.

The voltage to the Zener diode ZD is furnished by the "B" supply voltage in the amplifier power section and may be considered to be in the present example a 300-volt D.C. current which is applied to the Zener diode through a limiting resistor of proper value. When the reverse voltage across the Zener diode ZD is sufficiently high above the critical point at which this Zener diode of the example system is rated, the current conduction across the junction interface increases rapidly. This area of operation is called the Zener region. At voltages higher than the break-down point of the Zener diode ZD, known as the Zener knee, the voltage drop across the diode junction becomes constant for a limited wide range of currents. This is known in the art as the Zener control region or since a small increase of voltage above the Zener knee causes a sudden passage or cascade of larger currents, which is known as "avalanche" breakdown. As the voltages increase across the Zener diode ZD, the diode current increases proportionately; however, the Zener diode output voltage remains essentially constant as well as the junction voltage. That is to say, the Zener diode ZD, after the Zener knee portion of the curve is reached, will to a point pass access currents which tend to upset constant voltage on the Zener diode load. On the other hand, a drop in supply voltage has the opposite effect, that is, the effect of reducing the current through the junction of the Zener diode ZD to build up and restore the load voltage to its original constant value.

In the example system of the invention herein disclosed and described, the Zener diode voltage rating employed has been selected to produce a constant voltage equal to that of the voltage output of the tachometer generator TG when the ship's propeller shaft P is rotated at 5/6 of the maximum speed in the "ahead" direction.

A test check point 97a (see FIG. 13) on the check meter 97 has been provided for instantly ascertaining whether the voltage output of the Zener diode ZD is of proper value without the necessity of providing and using external test equipment. In the example system the voltage at the check point should be 25 to 30-volt D.C., and may be adjusted to match the check test voltage on the check meter when the test voltage switch 99 is depressed by its operating button 99a.

The indicating and recording instrument R utilizes a strip chart C that moves under the usual recording pen or stylus (not shown) and which inks a trace CT on the chart representing the horsepower and forming a permanent record indicating the horsepower over the period of time represented by the trace.

In the instant example the chart C is moved by any of the spring wound motors familiar in the art operating the usual accurate clock movement to maintain correct time-speed movement or displacement of the chart C. The spring (not shown) for this clock movement is wound periodically by an electric motor EM connected to the ship's electric alternating current power whenever the spring becomes unwound, all as will be familiar in this art and calls for no specific disclosure or further description. It should be here noted that in accordance with the present example system of the invention, a synchronous type electric clock motor has not been utilized in the instrument R because it would be unsatisfactory when installed on ships which may not have a synchronous electric system for accurate clock movement timing.

In this example the instrument R includes the D'Arsonval type of element or meter D that will react to a small current through its armature coil to magnetically force it to rotate by magnetic attraction to a permanent magnet surrounding the element, as will be recognized by those familiar with such type of meter. The ink pointer pen arm or stylus (not shown) is suitably connected to the shaft of the armature coil of the D'Arsonval meter so that the pen point thereof makes the trace CT on the chart, while the pointer IP (see FIG. 5) forming an element thereof sweeps across the dial or scale FC (see FIG. 5) of the instrument R for instantaneous horsepower readings. The adjustment to properly calibrate for recorder accuracy is effected through the medium of the recorder calibration potentiometer 108 and this potentiometer is adjusted manually by the adjustment means 534 on the sub-panel 532 within the control panel CP.

The shaft horsepower-hours integrating unit IT is included in the system, when desired, in order to totalize horsepower-hours over a period of time. This instrument IT is primarily included in the system for the purpose of totalizing the quantity of horsepower-hours for comparison against the quantity of fuel in pounds to be consumed. Thus, from this data it is possible to ascertain the ratio of horsepower-hours per pound of fuel from which the efficiency and cost of a ship's operation may be determined. The horsepower-hour readings are made on a digital cyclometer type of counter 357 and may be read periodically and noted for the record.

It is particularly noted that when the instrument IT is included in the system, the multiplying precision potentiometer PP has the section A thereof functioning for operation of the indicating and recording instrument R and the section B thereof functioning for operation of the instrument IT.

In order to make certain that the servo multiplying system is operating properly a check meter 97 is incorporated into the system for a rapid check test. In order to carry out such a check test, the power switch 68 is left in power-on position and the other three switches 63, 96 and 99 are placed in their "down" positions when referring to FIG. 4 of the drawings. This switch disconnects the servo motor SM and prevents it from driving the drum SD. The output voltage from the potentiometer PP is then shifted from the indicating and recording instrument R to the check meter 97. The switch 66 then shifts the output voltage of the tachometer generator TG from the precision potentiometer PP and inserts the internal standard test voltage of the Zener diode ZD.

The manual drum drive 507 is then operated with knob HK and turned in the "ahead" direction until the servo drum reads 100 divisions exactly. At this point the pointer on the check meter 97 should roughly coincide with the line above the horsepower check test markings 97b (see FIG. 13) on the dial of the check meter and if it does, then it indicates that this system is operating properly through a mid-scale average range. After this, the above-referred to switches should be restored to their normal upward operating positions, as shown in FIG. 4.

It is to be noted that when check testing as above, the alarm lamps are lighted to remind the operator that the switches are in abnormal positions and must be restored to normal positions. The system failure alarm lamp 82 is illuminated and serves as a visual alarm signal when the servo system or the torsion meter section in the torsion meter panel TP fails and the servo motor SM drives the servo mechanism into position against the stop means 235.

If the horsepower check test, as described above, does not give the required indication on the check meter 97, then the test voltage switch 99 may be depressed in order to make certain that the test voltage is at the correct value. The pointer on the check meter 97 should approximately coincide with a vertical line 97a (see FIG. 13) above the "test voltage" marking on the dial of the test meter. If the test meter does not so indicate, then the switch 99 may be depressed and the necessary adjustments of the potentiometer 222 made by the potentiometer adjusting means 535 on the sub-panel 532 within the control panel CP.

It will also be evident that various changes, modifications, variations, substitutions, eliminations and additions may be resorted to both as to the method and as to systems for carrying out the method of the invention, without departing from the broad spirit and scope of the invention; and hence I do not intend or desire to limit my invention either as to methods or as to systems thereof which are in all respects the exact and specific example embodiments or expressions of the invention as herein disclosed, described and explained, except as may be required by intended specific limitation thereto appearing in any of the claims hereto appended.

What I claim is:

1. In a system for determining the horsepower output of a power rotated shaft, in combination, transducer means operatively connected with said power rotated shaft for developing a voltage directly related to torque in said shaft at any given instant during powered rotation thereof; a galvanometer electrically connected with said transducer means and receiving therefrom said voltage; electronic amplifier means, the input thereof being connected to the input terminals of said galvanometer for amplifying said voltage; a servo motor; a power circuit to said servo motor; said servo motor being electrically connected with and operatively controlled by said amplified voltage from said amplifier means; a driving connection between said servo motor and said transducer means for operation by said servo motor to restore said transducer means to a condition at which said galvanometer indicates a null; a tachometer generator coupled with and driven by said power rotated shaft for generating a D.C. voltage directly proportional to the rate of speed of rotation of said shaft; a potentiometer means including center tapped resistance and a contact member movable across said resistance; means operatively coupling said contact member with said servo motor for movement of said contact member from said center tap to a position of displacement on said resistance corresponding to the extent of operation of said servo motor; a circuit connecting said tachometer generator with said potentiometer for supplying said D.C. voltage directly proportional to the speed of rotation of said shaft to said potentiometer means; and said potentiometer means developing from said position of displacement of said movable contact member relating to torque and in combination with said D.C. voltage proportional to speed of rotation of said shaft, a single output voltage accurately reflecting the horsepower output of said power rotated shaft at any given instant during powered rotation thereof.

2. In the combination of claim 1, said transducer means being comprised of a first transducer mounted on and operable by torsional twist in said power rotated shaft resulting from torque, and a second transducer means electrically connected with said first transducer means but mounted remote therefrom; said second transducer means being operated by said servo motor in accordance with the voltage signal developed by said first transducer means to bring said first and second transducers to null condition.

3. In the combination of claim 1, a visual indicating and recording instrument including electrically operated actuating means therefor; and a circuit connecting said potentiometer means with said electrical actuating means of said instrument for supplying said single output voltage from said potentiometer to said instrument.

4. In the combination of claim 3, a network in said potentiometer operative to maintain the linearity of said potentiometer.

5. In a system for continuously determining the horsepower output of a power rotated shaft and at any instant during the powered rotation of the shaft, in combination, a first transducer means mounted on and rotatable with said shaft and operated by torsional twist in the shaft from torque to develop a first voltage directly related to torque in said shaft at any given instant during the powered rotation thereof; a second transducer means for developing a second voltage mounted in fixed position and being connected with said first transducer; a galvanometer connected with and supplied by a combined voltage developed from said first and second voltages from both transducer means; amplifier means for amplifying said combined voltage developed by said both transducer means; a D.C. voltage generating tachometer generator coupled with and driven by said shaft for generating a third voltage directly proportional to the rate of speed of rotation of said shaft; a servo motor having its control winding connected to said amplifier means and receiving from said amplifier means said amplified combined voltage relating to torque; said servo motor having a reference winding; an electric power supply circuit connected to said reference winding; said servo motor being mechanically connected with said second transducer means and being operable by said amplified combined voltage developed from said both transducers to activate said second transducer means to balance said first mounted transducer means to bring said galvanometer to a null position; a potentiometer unit; supply circuits from said tachometer generator to said potentiometer unit for conducting said third voltage to said potentiometer unit; said potentiometer unit being mechanically connected to said servo motor and said potentiometer unit developing therein a mechanical displacement directly relating to torque and combined with said third voltage developed by said tachometer directly proportional to the rate of speed of rotation of said shaft to produce a single output fourth voltage accurately reflecting the horsepower output of said shaft at any given instant during powered rotation thereof.

6. In a system for determining the horsepower output of a power rotated shaft, in combination, a power rotated shaft being rotatable in a normal direction of rotation or in a reversed direction of rotation; transducer means operatively connected with said power rotated shaft for developing a voltage directly related to torque in said shaft at any given instant during powered rotation thereof; a galvanometer electrically connected with said transducer means and receiving therefrom said voltage; amplifier means for amplifying said voltage; a servo motor; a power circuit to said servo motor; said servo motor being electrically connected with and operatively controlled by said amplified voltage from said amplifier means; a driving connection between said servo motor and said transducer means for operation by said servo motor to restore said transducer means to a condition at which said galvanometer indicates a null; a tachometer generator coupled with and driven by said power rotated shaft for generating a D.C. voltage directly proportional to the rate of speed of rotation of said shaft; a potentiometer means including center tapped resistance and a contact member movable across said resistance; said center tap of said resistance of said potentiometer being a zero position and the section of said resistance at one side thereof being for normal rotation of said shaft and the section of said resistance at the opposite side thereof being for reversed direction of rotation of said shaft; means operatively coupling said contact member with said servo motor for movement of said contact member from said center tap to a position of displacement on said resistance corresponding to the extent of operation of said servo motor; and said means operatively coupling said contact member with said servo motor displacing said contact member in one direction during normal rotation and in the opposite direction during reversed rotation of said power rotated shaft; and said contact member of said potentiometer being displaced across said resistance section for normal direction of rotation of said shaft and being displaced across said other section during reverse direction of rotation of said shaft by said means coupling said contact member with said servo motor; a circuit connecting said tachometer generator with said potentiometer for supplying said D.C. voltage directly proportional to the speed of rotation of said shaft to said potentiometer means; and said potentiometer means developing from said position of displacement of said movable contact member relating to torque and in combination with said D.C. voltage proportional to speed of rotation of said shaft; a single output voltage accurately reflecting the horsepower output of said power rotated shaft at any given instant during powered rotation thereof.

7. In a system for determining the horsepower output of a power rotated shaft, in combination, transducer means operatively connected with said power rotated shaft for developing a voltage directly related to torque in said shaft at any given instant during powered rotation thereof; a galvanometer electrically connected with said transducer means and receiving therefrom said voltage; amplifier means for amplifying said voltage; a servo motor; a power circuit to said servo motor; said servo motor being electrically connected with and operatively controlled by said amplified voltage from said amplifier means; a driving connection between said servo motor and said transducer means for operation by said servo motor to restore said transducer means to a condition at which said galvanometer indicates a null; said driving connection between said servo motor and said transducer means including in-line shafting; and stop means limiting rotation of said shafting to 360° in one direction and 360° in the opposite direction; a tachometer generator coupled with and driven by said power rotated shaft for generating a D.C. voltage directly proportional to the rate of speed of rotation of said shaft; a potentiometer means including center tapped resistance and a contact member movable across said resistance; means operatively coupling said contact member with said servo motor for movement of said contact member from said center tap to a position of displacement on said resistance corresponding to the extent of operation of said servo motor; a circuit connecting said tachometer generator with said potentiometer for supplying said D.C. voltage directly proportional to the speed of rotation of said shaft to said potentiometer means; and said potentiometer means developing from said position of displacement of said movable contact member relating to torque and in combination with said D.C. voltage proportional to speed of rotation of said shaft, a single output voltage accurately reflecting the horsepower output of said power rotated shaft at any given instant during powered rotation thereof.

8. In a system for determining the horsepower output of a power rotated shaft, in combination, transducer means operatively connected with said power rotated shaft for developing a voltage directly related to torque in said shaft at any given instant during powered rotation thereof; a galvanometer electrically connected with said transducer means and receiving therefrom said voltage; amplifier means for amplifying said voltage; a servo motor; a power circuit to said servo motor; said servo motor being electrically connected with and operatively controlled by said amplified voltage from said amplifier means; a driving connection between said servo motor and said transducer means for operation by said servo motor to restore said transducer means to a condition at which said galvanometer indicates a null; said driving connection between said servo motor and said transducer means including in-line shafting; a torsion meter drum mounted on and rotatable with said shafting and having a visible scale around the periphery thereof; and a servo drum mounted on said shafting and having a visible scale around the periphery thereof; a tachometer generator coupled with and driven by said power rotated shaft for generating a D.C. voltage directly proportional to the rate of speed of rotation of said shaft; a potentiometer means including center tapped resistance and a contact member movable across said resistance; means operatively coupling said contact member with said servo motor for movement of said contact member from said center tap to a position of displacement on said resistance corresponding to the extent of operation of said servo motor; a circuit connecting said tachometer generator with said potentiometer for supplying said D.C. voltage directly proportional to the speed of rotation of said shaft to said potentiometer means; and said potentiometer means developing from said positon of displacement of said movable contact member relating to torque and in combination with said D.C. voltage proportional to speed of rotation of said shaft, a single output voltage accurately reflecting the horsepower output of said power rotated shaft at any given instant during powered rotation thereof.

9. In a system for determining the horsepower output of a power rotated shaft, in combination, transducer means operatively connected with said power rotated shaft for developing a voltage directly related to torque in said shaft at any given instant during powered rotation thereof; a galvanometer electrically connected with said transducer means and receiving therefrom said voltage; amplifier means for amplifying said voltage; a servo motor; a power circuit to said servo motor; said servo motor being electrically connected with and operatively controlled by said amplified voltage from said amplifier means, a driving connection between said servo motor and said transducer means for operation by said servo motor to restore said transducer means to a condition at which said galvanometer indicates a null; said driving connection between said servo motor and said transducer means including in-line shafting; a reduction gear unit between said servo motor and said shafting; a slip clutch in said shafting between said gear unit and said transducer means; a servo drum mounted on said shafting between said slip clutch and said transducer means; a slide universal joint unit incorporated in said shafting between said servo drum and said transducer means, and a torsion meter drum on said shafting between said servo drum and said transducer means; a tachometer generator coupled with and driven by said power rotated shaft for generating a D.C. voltage directly proportional to the rate of speed of rotation of said shaft; a potentiometer means including center tapped resistance and a contact member movable across said resistance; means operatively coupling said contact member with said servo motor for movement of said contact member from said center tap to a position of displacement on said resistance corresponding to the extent of operation of said servo motor; a circuit connecting said tachometer generator with said potentiometer for supplying said D.C. voltage directly proportional to the speed of rotation of said shaft to said potentiometer means; and said potentiometer means developing from said position of displamement of said movable contact member relating to torque and in combination with said D.C. voltage proportional to speed of rotation of said shaft, a single output voltage accurately reflecting the horsepower output of said power rotated shaft at any given instant during powered rotation thereof.

10. In a system for determining the horsepower output of a power rotated shaft, said shaft being rotatable in a normal direction of rotation or in a reverse direction of rotation, in combination, transducer means operatively connected with said power rotated shaft for developing a voltage directly related to torque in said shaft at any given instant during powered rotation thereof; a galvanometer electrically connected with said transducer means and receiving therefrom said voltage; amplifier means for amplifying said voltage; a servo motor; a power circuit to said servo motor; said servo motor being electrically connected with and operatively controlled by said amplified voltage from said amplifier means; a driving connection between said servo motor and said transducer means for operation by said servo motor to restore said transducer means to a condition at which said galvanometer indicates a null; said driving connection between said servo motor and said transducer means including rotatable in-line shafting rotated in one direction when said power rotated shaft is rotated in its normal direction and rotated in the opposite direction when said power rotated shaft is rotated in the reverse direction; an electrical circuit having an alarm lamp connected therein; a normally open switch in said circuit; and means on said in-line shafting for operating said switch to close said circuit and illuminate said alarm lamp when said in-line shafting is rotated by the reverse direction of rotation of said power rotated shaft; a tachometer generator coupled with and driven by said power rotated shaft for generating a D.C. voltage directly proportional to the rate of speed of rotation of said shaft; a potentiometer means including center tapped resistance and a contact member movable across said resistance; means operatively coupling said contact member with said servo motor for movement of said contact member from said center tap to a position of displacement on said resistance corresponding to the extent of operation of said servo motor; a circuit connecting said tachometer generator with said potentiometer for supplying said D.C. voltage directly proportional to the speed of rotation of said shaft to said potentiometer means; and said potentiometer means developing from said position of displacement of said movable contact member relating to torque and, in combination with said D.C. voltage proportional to speed of rotation of said shaft, a single output voltage accurately reflecting the horsepower output of said power rotated shaft at any given instant during powered rotation thereof.

11. In a system for determining the horsepower output of a power rotated shaft, in combination, transducer means operatively connected with said power rotated shaft for developing a voltage directly related to torque in said shaft at any given instant during powered rotation thereof; a galvanometer electrically connected with said transducer means and receiving therefrom said voltage; amplifier means for amplifying said voltage; a servo motor; a power circuit to said servo motor; said servo motor being electrically connected with and operatively controlled by said amplified voltage from said amplifier means; a driving connection between said servo motor and said transducer means for operation by said servo motor to restore said transducer means to a condition at which said galvanometer indicates a null; said driving connection between said servo motor and said transducer means, including rotary shafting; a tachometer generator coupled with and driven by said power rotated shaft for generating a D.C. voltage directly proportional to the rate of speed of rotation of said shaft; a potentiometer means including center tapped resistance and a contact member movable across said resistance; means including therein reduction gearing operatively connected between said rotary shafting and said contact member, operatively coupling said contact member with said servo motor for movement of said contact member from said center tap to a position of displacement on said resistance corresponding to the extent of operation of said servo motor; a circuit connecting said tachometer generator with said potentiometer for supplying said D.C. voltage directly proportional to the speed of rotation of said shaft to said potentiometer means; and said potentiometer means developing from said position of displacement of said movable contact member relating to torque and in combination with said D.C. voltage proportional to speed of rotation of said shaft, a single output voltage accurately reflecting the horsepower output of said power rotated shaft at any given instant during powered rotation thereof.

12. In a system for determining the horsepower output of a power rotated shaft, in combination, transducer means operatively connected with said power rotated shaft for developing a voltage directly related to torque in said shaft at any given instant during powered rotation thereof; a galvanometer electrically connected with said transducer means and receiving therefrom said voltage; amplifier means for amplifying said voltage; a servo motor; a power circuit to said servo motor; said servo motor being electrically connected with and operatively controlled by said amplified voltage from said amplifier means; a driving connection between said servo motor and said transducer means for operation by said servo motor to restore said transducer means to a condition at which said galvanometer indicates a null; a tachometer generator coupled with and driven by said power rotated shaft for generating a D.C. voltage directly proportional to the rate of speed of rotation of said shaft; a potentiometer means including a center tapped resistance and a contact member movable across said resistance, said potentiometer means also including a second center tap resistance identical with said first mentioned center tap resistance and a second contact member movable across said second center resistance; and means coupling said second contact member of said second resistance with said servo motor for movement of said second contact member from said center tap position to a position of displacement on said second resistance corresponding to the extent of operation of said servo motor; means operatively coupling said first mentioned contact member with said servo motor for movement of said first mentioned contact member from said center tap to a position of displacement on said resistance corresponding to the extent of operation of said servo motor; a circuit connecting said tachometer generator with said potentiometer means for supplying said D.C. voltage directly proportional to the speed of rotation of said shaft to said potentiometer means; and said potentiometer means developing from said position of displacement of said first mentioned movable contact member relating to torque and in combination with said D.C. voltage proportional to speed of rotation of said shaft, a single output voltage accurately reflecting the horsepower output of said power rotated shaft at any given instant during powered rotation thereof; and said potentiometer means developing from the position of displacement of said second mentioned movable contact member a single output voltage accurately reflecting the horsepower-hour output.

13. In combination of claim 12, wherein a corrective network is connected with said first mentioned resistance and a second corrective network is connected with said second mentioned resistance for maintaining the linearity of said potentiometer means; a horsepower-hour integrator having an electrically operated actuating component; and a circuit connected between said second resistance of said potentiometer means and said electrically operated component of said integrating instrument for supplying said single output voltage relating to horsepower-hours to said integrating instrument.

14. In the combination of claim 13, said first and second center tap resistances, each being provided with further taps on either side of said center tap, each such further tap being equally spaced from said center tap and from each end terminal of said resistance.

References Cited by the Examiner

UNITED STATES PATENTS

| | | | |
|---|---|---|---|
| 900,427 | 10/1908 | Rush | 116—115 |
| 2,353,691 | 7/1944 | Clingman | 73—137 |
| 2,530,022 | 11/1950 | Mershon | 73—136 |
| 2,580,677 | 1/1952 | Hadley | 200—61.39 |
| 2,675,700 | 4/1954 | Van Decrift et al. | 73—136 |
| 2,846,534 | 8/1958 | Morrill | 200—61.39 |
| 2,949,029 | 9/1960 | Bayles et al. | 73—136 |
| 2,993,369 | 7/1961 | Bonomo et al. | 73—136 X |
| 3,045,478 | 7/1962 | Dinlocker | 73—136 |
| 3,049,003 | 8/1962 | Felder | 73—136.1 |

FOREIGN PATENTS 588,677  5/1947  Great Britain.

OTHER REFERENCES

Andrews, Alan: ABC's of Synchros and Servos, Howard W. Sams and Co., Inc., New York, May 1962, TJ 214.

RICHARD C. QUEISSER, *Primary Examiner.*

DAVIS SCHONBERG, *Examiner.*

E. KARLSEN, J. J. SMITH, *Assistant Examiners.*